(12) United States Patent
Chang et al.

(10) Patent No.: US 10,871,498 B2
(45) Date of Patent: Dec. 22, 2020

(54) SAMPLE PROCESSING MODULE ARRAY HANDLING SYSTEM AND METHODS

(71) Applicant: Cepheid, Sunnyvale, CA (US)

(72) Inventors: Ronald Chang, Sunnyvale, CA (US); Steven Montgomery, Sunnyvale, CA (US); Gregory Mote, Sunnyvale, CA (US); Brian Bliven, San Jose, CA (US)

(73) Assignee: Cepheid, Sunnyvale, CA (US)

( * ) Notice: Subject to any disclaimer, the term of this patent is extended or adjusted under 35 U.S.C. 154(b) by 399 days.

(21) Appl. No.: 15/816,960

(22) Filed: Nov. 17, 2017

(65) Prior Publication Data

US 2018/0143215 A1    May 24, 2018

Related U.S. Application Data

(60) Provisional application No. 62/424,313, filed on Nov. 18, 2016.

(51) Int. Cl.

| | | |
|---|---|---|
| *B01L 9/00* | (2006.01) | |
| *G01N 35/02* | (2006.01) | |
| *G01N 35/00* | (2006.01) | |
| *G01N 35/04* | (2006.01) | |

(52) U.S. Cl.
CPC ..... *G01N 35/025* (2013.01); *G01N 35/00029* (2013.01); *G01N 35/00732* (2013.01); *G01N 35/00871* (2013.01); *G01N 35/04* (2013.01); *G01N 2035/00148* (2013.01); *G01N 2035/00158* (2013.01); *G01N 2035/00326* (2013.01); *G01N 2035/00356* (2013.01); *G01N 2035/00445* (2013.01); *G01N 2035/00881* (2013.01); *G01N 2035/0425* (2013.01); *G01N 2035/0427* (2013.01); *G01N 2035/0451* (2013.01); *G01N 2035/0453* (2013.01); *G01N 2035/0465* (2013.01)

(58) Field of Classification Search
CPC ............................. B01L 2200/025; B01L 7/52
USPC ........................................ 422/561, 560, 554
See application file for complete search history.

(56) References Cited

U.S. PATENT DOCUMENTS

2015/0177110 A1*  6/2015  Cargill ................. G01N 1/14
                                                        414/331.02

* cited by examiner

*Primary Examiner* — Natalia Levkovich
(74) *Attorney, Agent, or Firm* — Kilpatrick Townsend & Stockton LLP

(57) ABSTRACT

A handling system for high throughput processing of a large volume of biological samples is provided herein. Such systems can include an array support assembly that supports multiple diagnostic assay modules in an array having at least two dimensions, a loader that loads multiple diagnostic assay cartridges within the multiple diagnostic assay modules. The array support assembly can be movable relative the loader to facilitate loading and unloading so as to provide more efficient processing.

40 Claims, 31 Drawing Sheets

SAMPLE PROCESSING MODULE ARRAY HANDLING SYSTEM AND METHODS

CROSS-REFERENCES TO RELATED APPLICATIONS

This Non-Provisional application claims the benefit of priority to U.S. Provisional Application No. 62/424,313 filed Nov. 18, 2016, the entire contents of which are incorporated herein by reference.

This application is generally related to U.S. patent application Ser. No. 15/217,920 entitled "Molecular Diagnostic Assay System," filed Jul. 22, 2016 which is incorporated herein by reference in its entirety for all purposes.

BACKGROUND OF THE INVENTION

The present invention relates to the field of fluidic devices for carrying out multiplex chemical or biochemical reactions and for performing multiplex chemical and/or biochemical assays. More particularly, this invention relates to a handling system for devices configured for carrying out multiplex chemical and/or biochemical reactions, and detecting a plurality of chemical and/or biochemical compounds.

Modern disease diagnosis, pathogen detection, gene discovery, drug development, and various genetic-related technologies and research increasingly rely on processing a large number of biological samples. Traditional methods of processing the samples one at a time have become increasingly inadequate and the demand for performing assays on a large volume of samples simultaneously has steadily increased, particularly in recent years. Hence, there is a need for chemical/biochemical reaction systems and devices that perform high-throughput assays.

Conventional high throughput methods can include the use of microarrays, such as a DNA microarray, which is typically a two-dimensional array of DNA molecules attached to a solid substrate on its surface. A DNA microarray can provide a useful platform as a multiplexing detection device. For example, each element of the array has a unique DNA sequence that is used to recognize or detect a unique complementary DNA sequence in a prepared fluid sample. These DNA microarrays have fundamentally changed conventional approaches of observing one or a few genes or molecules at a time to observing pathways, networks, and a large collection of genes and pools of molecules. Such DNA microarray chips available today typically operate based on the hybridization of target DNA or RNA molecules from the fluid sample in a solution phase with probe DNA (e.g. oligonucleotides or cDNA) molecules immobilized on solid substrates of the array. The arrays do not however provide for a rapid cost-effective way of detecting low abundance targets that can indicate the presence of an infectious disease or other pathogenic state, which is more typically detected using sensitive methods such as real-time PCR. A real-time PCR system detects PCR products as they accumulate during a PCR process and allows for improved speed and efficiency in performing assay, but these systems are typically hindered by the need to process the samples as a "batch" thus resulting in a delay of processing some samples until enough have been collected to make the overall process more cost effective, but this leads to increased turn-around-time. Such delays and increased cost lead to less efficiency and overall increase in health care costs.

Sample preparation is another typical problem that hinders the speed at which large volumes of diagnostic assays can be performed. Although many such systems require separate processing of the fluid sample before introduction into a real-time PCR diagnostic assay device, there are advances in recent years that provide automated sample preparation that is coordinated with real-time PCR analysis within a single analytical device or system. One such device is the GeneXpert device developed by Cepheid as described in, e.g., U.S. Pat. Nos. 8,048,386; 6,374,684, and U.S. patent application Ser. Nos. 13/843,739 and 15/217,920, each incorporated herein by reference.

The current Cepheid systems are provided to an end-user as individual modules, or a small system of grouped modules, or large scale systems. Currently available small systems provide an enclosure that includes a small number of modules, e.g. 2, 4, 8 or 16 modules, while the large scale systems can provide 48 or 80 modules. The small systems are well suited for small-scale operations, but cannot provide the high throughput demands of a large-scale operation, such as a laboratory or testing facility.

Although commercially available large systems, including Cepheid's Infinity 48 and 80 systems, provide a higher throughput of diagnostic assay testing, such systems are exceedingly large and typically require large rooms that are accessible through oversized doors that allow for delivery of such systems. These types of rooms are typically found in a clean setting of a hospital or laboratory and often must be specially built or modified to allow the system to be delivered and installed. This can require tremendous capital costs, in addition to the considerably high costs of the system, which can put installation of high throughput analytical systems beyond the reach of some diagnostic testing centers and laboratories. Such systems are also exceedingly large and since floor space in such facilities can be difficult and costly to obtain without displacing existing equipment or personnel, some facilities rely on undersized systems or multiple smaller systems, which often cannot meet the high throughput demands of the facility. These issues can result in a backlog or excessive wait times for analytical results. For example, such facilities may take one to three days (or more) to report a requested diagnostic test to the patient or physician from when the sample is first collected, even though the associated diagnostic assay may take only a few hours. Similar delay problems are faced by systems that use "batch" processing. Such delays are troubling, particularly when attempting to diagnose life threatening illnesses or screening individuals exposed to an outbreak of a pathogen or disease where unnecessary delays or isolation can cost lives and increases overall healthcare costs.

Thus, there is a need for a high throughput handling system that allows for processing of a large volume of samples in a more efficient and expedient manner. There is further need for such high throughput handling systems that are amenable to being incorporated into existing testing facilities where access, space and costs are of particular concern.

BRIEF SUMMARY OF THE INVENTION

The present invention relates to high throughput handling systems, devices and methods for processing of large volumes of biological samples, and in particular systems for performing diagnostic assays as detailed in the various embodiments as described herein.

In some embodiments, the invention provides a handling system for high throughput processing of a plurality of biological samples, each sample being within a respective cartridge of a plurality of diagnostic assay cartridges. The system can include an array support assembly adapted to support a plurality of diagnostic assay modules in an array having at least two dimensions, typically a cylindrical array. In some embodiments, the array has a shape other than cylindrical, for example, the array can be elliptical, hexagonal, octagonal, or other geometrical configurations suitable for use with the invention. Each diagnostic assay module includes a diagnostic assay system adapted for receiving a diagnostic assay cartridge and performing a diagnostic assay on a biological sample within the cartridge. The system can further include a loader adapted to load each of the plurality of diagnostic assay cartridges within a diagnostic assay module within the array. The array support assembly is movable relative the loader such that the cartridge is loadable in any of the modules within the array by moving the loader relative the array. In some embodiments, the array is a cylindrical array that rotates along its longitudinal axis and the loader mechanism translates vertically in an elevator adjacent the cylindrical array.

In some embodiments, the invention provides methods of handling a plurality of biological samples with a high throughput processing system. Such methods can include: receiving multiple diagnostic assay cartridges in a high throughput processing system; and loading, with a loader, each of the plurality of diagnostic assay cartridges into a respective diagnostic assay module of a plurality of diagnostic assay modules within an array support defining an array having at least two dimensions. Each module includes a diagnostic assay system adapted for receiving a diagnostic assay cartridge of the plurality and performing a diagnostic assay on a biological sample within the respective cartridge. Loading can include moving the array support relative the loader such that the diagnostic assay cartridge is loadable in any of the diagnostic assay modules within the array by moving the array in combination with the loader. In some embodiments, the array is a cylindrical array enclosed by an outer shell and the methods can further include cooling a microenvironment of the array by forcing air upwards through an open central column and directing the cooling air through each row of the array with one or more baffles between rows of the array within the outer shell.

DETAILED DESCRIPTION OF THE INVENTION

The present invention relates generally to systems, devices and methods for providing high throughput performance in the analysis/testing of biological samples, as detailed in the various embodiments described herein. The system utilizes an array of diagnostic assay modules that are movable relative a loader to allow concurrent processing of a large volume of biological fluid samples received in diagnostic assay cartridges within the array of modules. In some embodiments, the diagnostic assay modules are each capable of performing sample preparation as well as a diagnostic assay of a fluid sample within a diagnostic assay cartridge disposed therein. Typically, the diagnostic assay modules can be independently operable such that the processing in each module is performed separately from each other. Although in some embodiments the modules are identical, it is appreciated that the array can include differing types of modules as well. Such a configuration is advantageous as individual modules can be removed/replaced and serviced as needed without adversely affecting or require dismantling of other modules or mechanisms.

These and other aspects can be further understood by reference to the various embodiments shown in the following figures and described in the text.

Figure 1A:
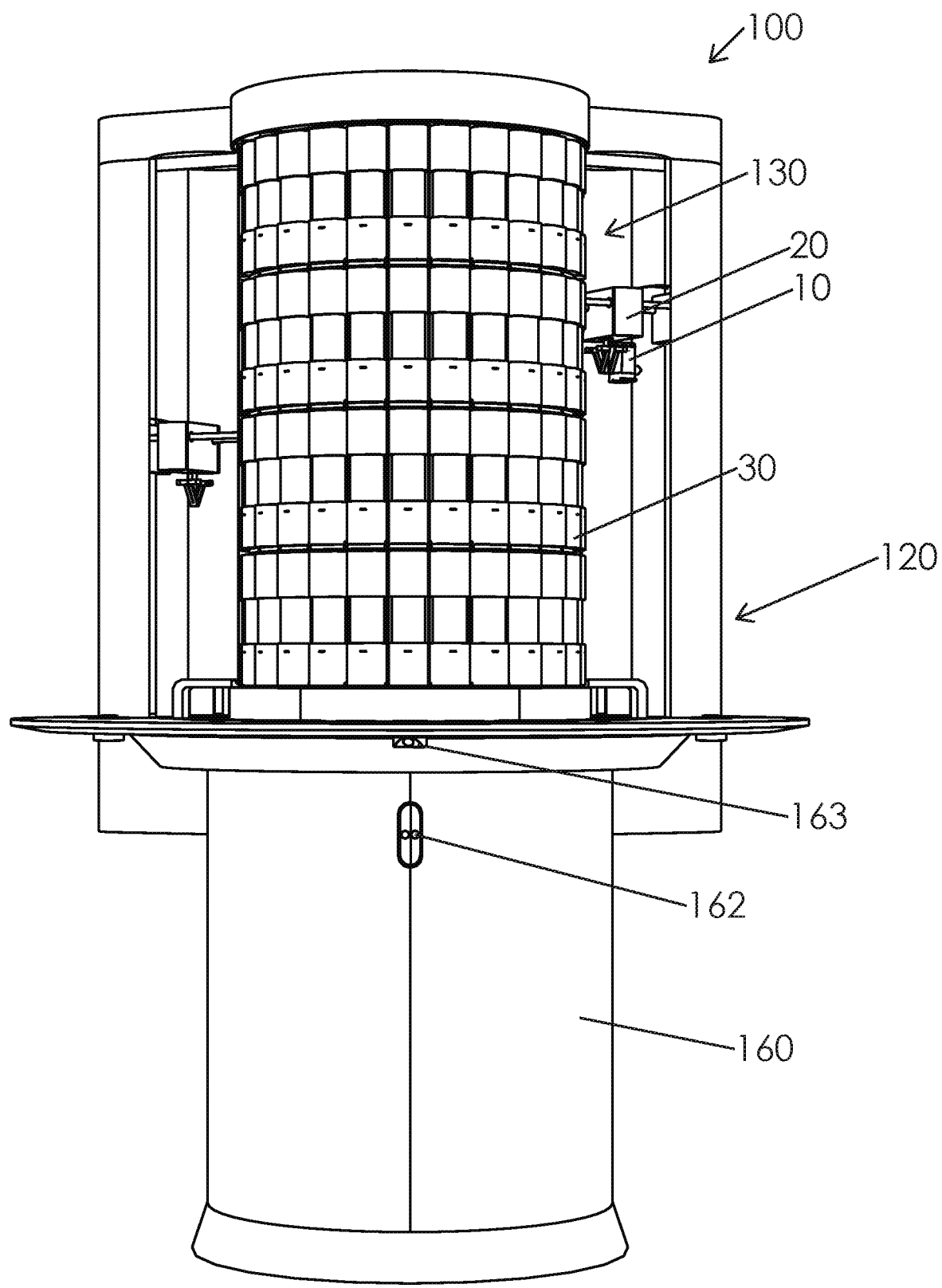
FIG. 1A provides an overview of a high throughput handling system for performing processing and diagnostic assays of a high-volume stream of samples, in accordance with some embodiments of the invention.

FIG. 1A depicts a high throughput handing system 100 having an array support assembly 130 that supports an array of diagnostic assay modules 30. In this embodiment, each module is configured with the same function and capabilities for processing a fluid sample within a diagnostic assay cartridge 10 inserted and received therein. In this embodiment, the array is a cylindrical array having four circular rows, each row supporting 25 diagnostic assay modules 30 such that the entire system 100 includes 100 independent modules. Various other configurations, having more or fewer rows, or more or fewer modules per row could be utilized. System 100 includes two elevators 120 to facilitate loading and unloading of the cartridges 10 from the modules 30 of the array. Each elevator includes a loader 20 adapted to releasably hold a diagnostic assay cartridge and position the cartridge into any of the available modules 30 and/or to remove a spent cartridge 10 from any of the modules 30 after processing to be discarded. Although this embodiment includes two such elevators, more or fewer elevators could be utilized. Advantageously, the entire array of 100 cartridges can be loaded in about 10 minutes by a single elevator and can be loaded in less than seven minutes by use of two elevators. The above described configuration allows for throughput and processing speeds that are vastly improved as compared to conventional processing systems. Each cylindrical row is rotatable along a longitudinal axis of the array and the elevator travels between rows of the array, typically by translating vertically. In some embodiments, each cylindrical row rotates in steps such that a diagnostic assay cartridge receptacle bay of each diagnostic assay module is positioned adjacent the elevator for a time sufficient to facilitate loading and/or unloading of a cartridge, at least a second or more, typically a few seconds (e.g., 3-5 seconds), in some embodiments, about 10 seconds or more.

Such a configuration allows for ready access to any of the modules by combined movement of the elevator and the array, such that the diagnostic assay cartridges can be loaded and unloaded from modules 30 considerably faster than a system having a planar rectangular array of receptacles for receiving such cartridges. In some embodiments, the rows of the array revolve separately from each other, for example, adjacent rows can travel in opposite directions, and in some embodiments, each row can travel in the same direction or the entire cylindrical array can be fixed and revolve as a single unit. In some embodiments, not all rows of the array rotate. For example, one row of the array can be held stationary, while the remaining rows of the array rotate (either together or in opposite directions).

In some embodiments, the modules of the array are independently operable and are electrically and communicatively coupled with a central power source and communication platform, which can be housed within a base 160 of the system. Base 160 includes two doors that house one or more waste receptacles into which spent diagnostic assay cartridges are automatically discharged after processing. A waste capacity indicator 162 (e.g. LED) indicates to a user that the receptacle is full. The indicator 162 can be lit in response to a determination that the receptacle is full, based on a diagnostic assay cartridge count or a weight of the receptacle. In some embodiments, the waste capacity indicator 162 can indicate differing states as the waste receptacle fills, for example, green/yellow/red corresponding to partly empty/near full/completely filled. In some embodiments, the indicator 162 is disposed on a central post on an interior of the base and the handles of the doors are translucent to allow a user to view the indicator LED through the handles. Base 160 can also include proximity sensor 163 that detects approach of personnel and initiates rotation of the loading track to receive cartridges to be loaded for analysis. Base 160 can further house various control, power and communication features or hubs to facilitate coordinated control of system components and automation of the system. As shown in FIG. 1H, base can include controller 180, automation computer 181, power distributor 182 and communication hub 183 (e.g. ethernet hub). It is appreciated that the controller, automation computer and communication hub can include hardwired communication and/or wireless communication. Further, such features can be centralized or divided among multiple units. For example, controller 180 can initiate various control aspects of the overall system and communicate with individual controllers associated with each of the modules of the array.

In some embodiments, each diagnostic assay module 30 is configured to receive a diagnostic assay cartridge having a reaction vessel or tube extending from the cartridge configured for detection of a nucleic acid target in a nucleic acid amplification test (NAAT), e.g., Polymerase Chain Reaction (PCR) assay. Preparation of a biological fluid sample in such a cartridge generally involves a series of processing steps, which can include chemical, electrical, mechanical, thermal, optical or acoustical processing steps according to a specific protocol. Such steps can be used to perform various sample preparation functions, such as cell capture, cell lysis, purification, binding of analyte, and/or binding of unwanted material. In some embodiments, the diagnostic assay cartridge can include one or more chambers suited to perform the sample preparation steps. A diagnostic assay cartridge suitable for use with the invention is shown and described in U.S. Pat. No. 6,374,684, entitled "Fluid Control and Processing System" filed Aug. 25, 2000, and U.S. Pat. No. 8,048,386, entitled "Fluid Processing and Control," filed Feb. 25, 2002, the entire contents of which are incorporated herein by reference in their entirety for all purposes. The arrays of modules described herein can include modules in accordance with those detailed in U.S. patent application Ser. No. 15/217,920 entitled "Molecular Diagnostic Assay System," filed Jul. 22, 2016. It is appreciated, however, that the systems described herein can include various other types of modules and cartridges as well, as will be known to persons of skill in the art.

Non-limiting exemplary nucleic acid amplification methods suitable for use with the invention include, polymerase chain reaction (PCR), reverse-transcriptase PCR (RT-PCR), Ligase chain reaction (LCR), transcription mediated amplification (TMA), and Nucleic Acid Sequence Based Amplification (NASBA), and isothermal amplification. Additional nucleic acid tests suitable for use with the instant invention are well known to persons of skill in the art. Analysis of a fluid sample generally involves a series of steps, which can include any of: optical detection, electrical detection or chemical detection, according to a particular protocol.

Figure 1B:
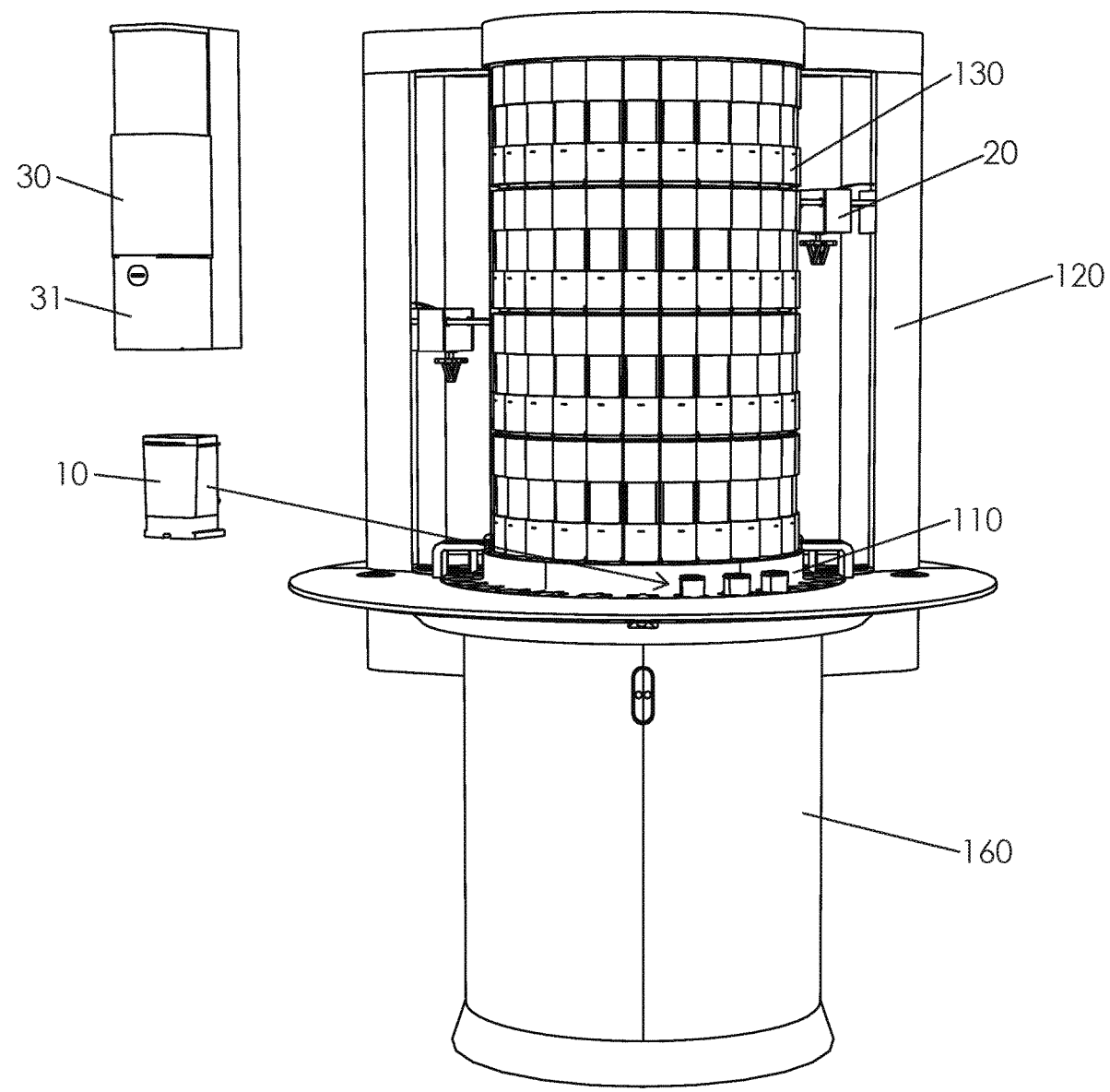
FIG. 1B shows a schematic illustrating the diagnostic assay module and diagnostic assay cartridge(s) within the high throughput handling system of FIG. 1A, in accordance with some embodiments.
Figure 1C:
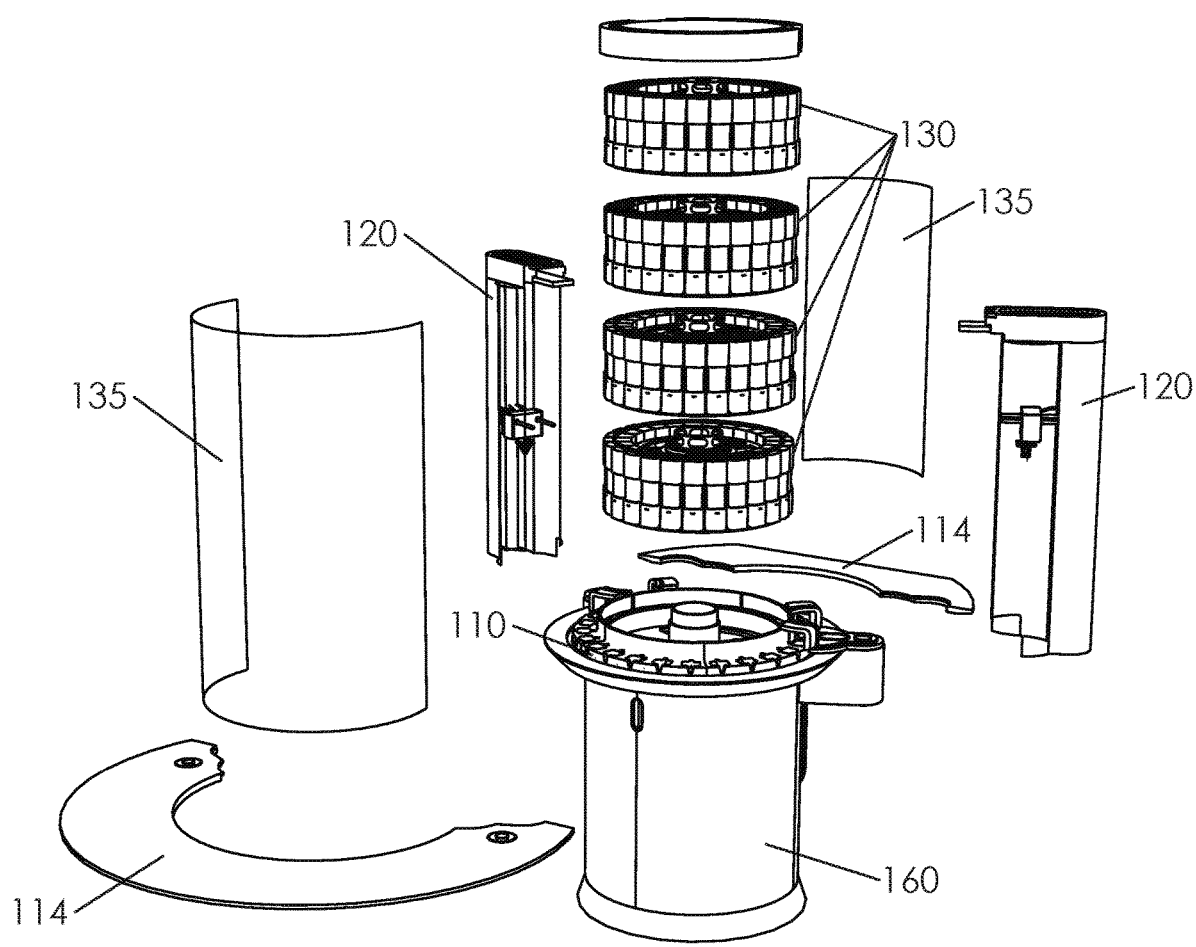
FIG. 1C shows an exploded view of the high throughput handling system of FIG. 1A, in accordance with some embodiments.

FIG. 1B shows such a diagnostic assay cartridge 10 adapted for use with a diagnostic assay module 30 within the array of modules supported by the array support assembly 130. When using the module 30 separately from the array in system 100, a user inserts the cartridge 10 directly into a receiving bay behind door 31. The module 30 can be configured to open door 31 when the bay is empty and the module 30 is ready to perform sample processing or when sample processing is complete to facilitate removal of the spent cartridge. In system 100, the diagnostic assay cartridges are placed in a queue within a loading track 110, which revolves around the cylindrical array to transport each cartridge 10 to the elevator 120. The loader 20 then picks up each cartridge to be processed and the loader translates vertically along the elevator to the appropriate row of the module in which the cartridge is loaded. The basic elements of system 100 can be seen in the exploded view shown in FIG. 1C, which shows the four levels of the array support assembly 130, each level having multiple diagnostic modules 30 mounted therein, the transparent shell 135 that encases the array to allow a clean temperature controlled environment to be maintained, two elevators 120, counter 114 and base 160 with cartridge loading track 110. Elevators 120 can be further understood by referring to the exploded view shown in FIG. 1E. In some embodiments, loading track 110 is cylindrical, but it is appreciated that loading track 110 can be any geometrical shape as long as the track connects back on itself such that the track is continuous and recirculates.

Figure 1D:
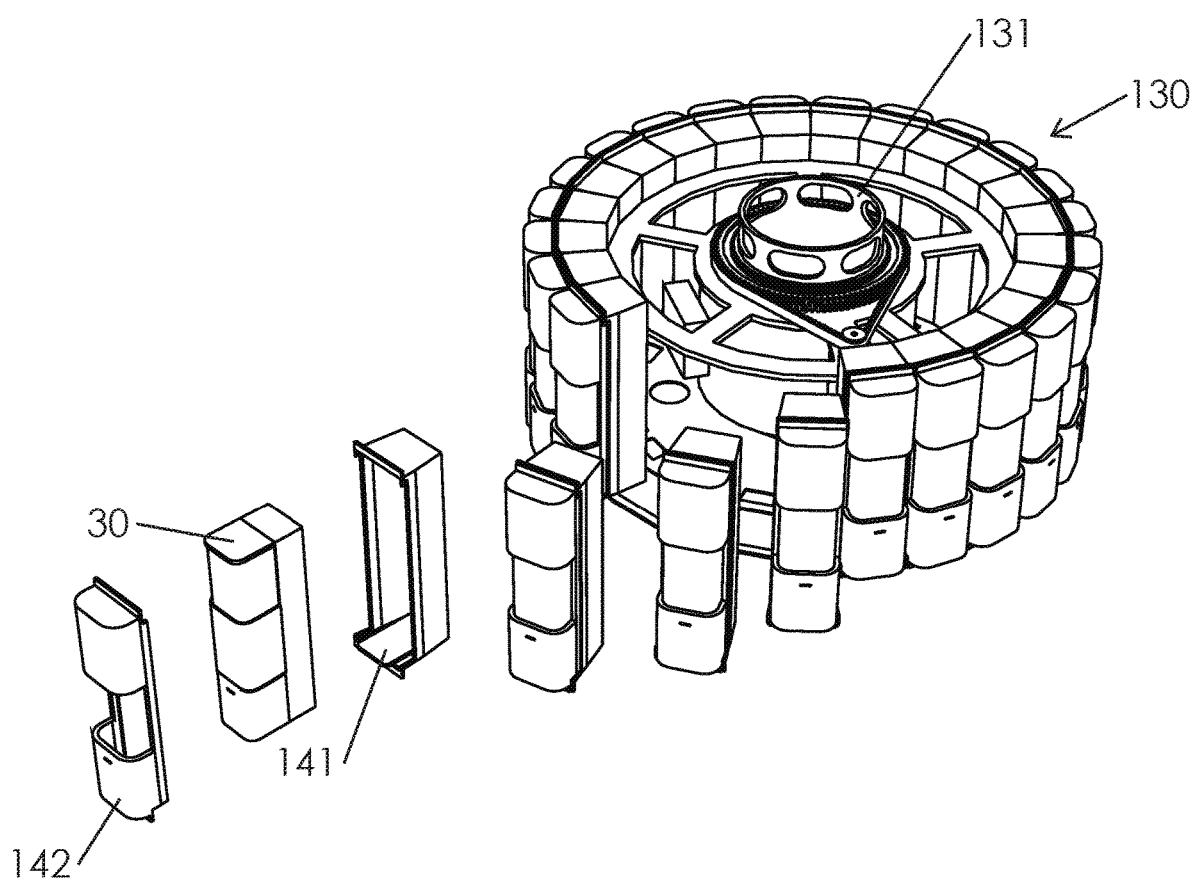
FIG. 1D shows a diagnostic assay modules assembly insertable into a circular level of the array of the high throughput handling system of FIG. 1A, in accordance with some embodiments.
Figures 1E, 1F:
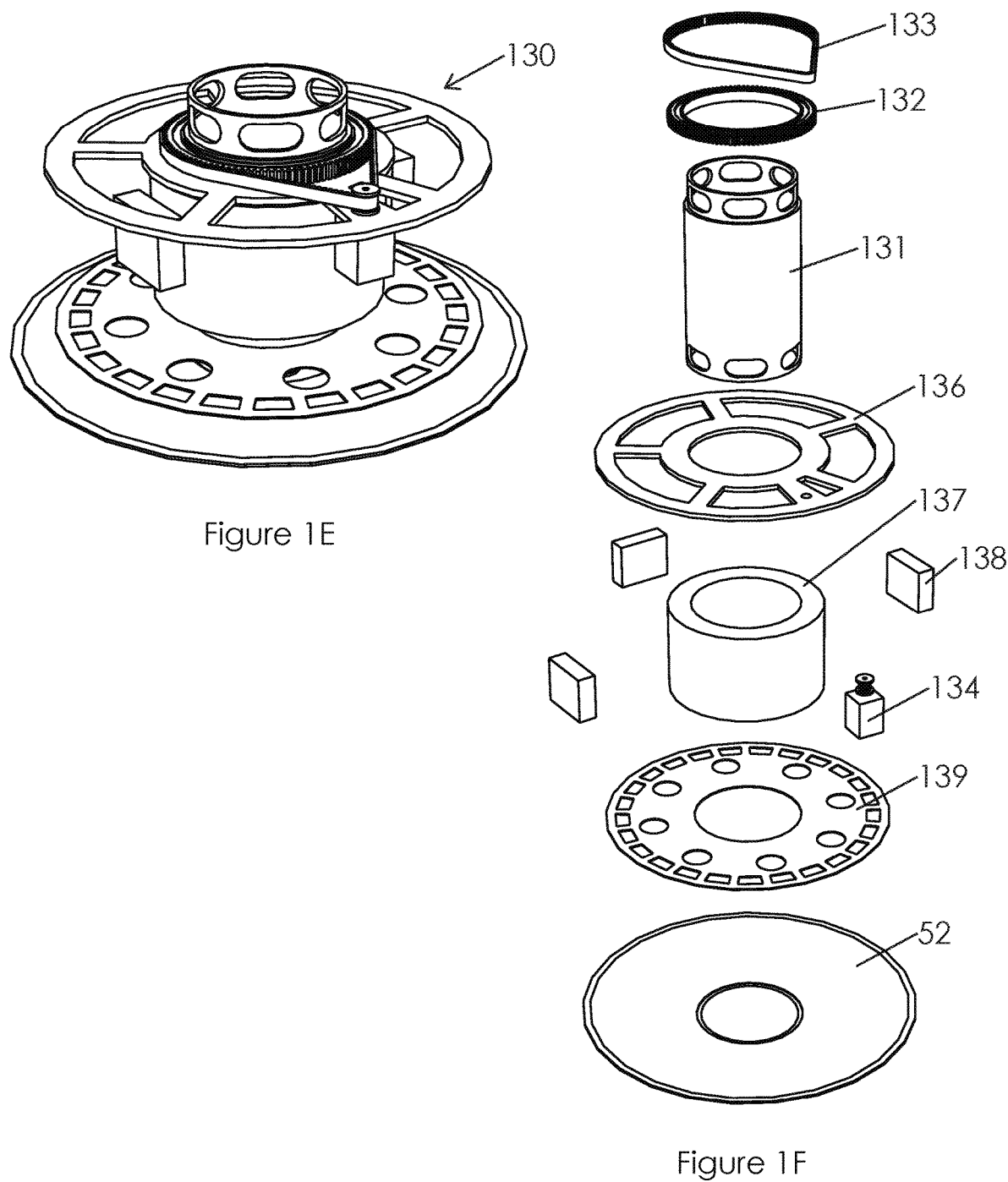
FIG. 1E shows a support assembly and rotation actuators to facilitate rotation of a circular level of the array of the high throughput handling system of FIG. 1A, in accordance with some embodiments.
FIG. 1F shows an exploded view of the support assembly of FIG. 1E, in accordance with some embodiments.

FIG. 1D shows an individual rotatable level of the array support 130 that supports multiple diagnostic assay modules 30 therein. Each diagnostic assay module 30 is contained within a carrier 141 having a carrier cover 142 with a front opening to allow access to the loading bay of a respective module 30. The carrier 141 is securely attached to corresponding supports within the array support 130, which can be further understood by referring to FIG. 1E and the exploded view of the array support shown in FIG. 1F. The support includes a slip ring, which includes a fixed slip ring portion 131 at its center, which carries power and data through a rotating union, and a rotating hub 137 which interfaces with an upper frame 136 that includes engineered cutouts for interfacing with and securely attaching multiple module carriers 141 therein to support the modules within the level. A circuit board 139 (e.g. PCB) disposed near the bottom electrically interface with each of the modules when mounted therein. Upper frame 136 is coupled with a ring gear 132, which is rotatably controlled by motor 134 via drive mechanism 133 to allow each level to be incrementally rotated, as described herein. Motor 134 can be a server motor, stepper motor or any suitable motor. Drive mechanism 133 can be a drive belt, cable, screw, gear or any suitable drive mechanism. Movement of the level of the array can be controlled by controller 138. In some embodiments, controller 138 can include power control and motor motion control. Associated components can include a power transformer, power production distributor and various power distribution components. Baffle 52 interfaces with the bottom of the support and facilitates controlled airflow through each level. In some embodiments, the baffle along the bottom of each level differs between each level to provide graduated destratification of airflow between levels, providing more airflow where needed.

System 100 can include a controller that coordinates movements between the various components of the system described herein. For example, each module 30 can communicate, either directly or wirelessly, to the central controller such that the controller can identify which modules 30 are empty and can direct the elevator to the appropriate row to arrive at the identified module 30. In some embodiments, each module communicates with a diagnostic assay cartridge 10 inserted therein by near field communication (NFC) by which an ID of the cartridge containing a biological fluid sample and an appropriate assay protocol is obtained by the module 30. Likewise, the module 30 communicates when a sample processing is completed and the cartridge is ready to be removed such that the controller sends a command to the loader to translate along the elevator to the appropriate location to remove the spent cartridge. Although the elevator moves on command to a particular vertical location, the rows of the array support moves in regular increments (typically, a rotation sufficient to move the next adjacent column of diagnostic module of the array to the elevator) at regular intervals (typically, at least one second or more to allow loading/unloading of a diagnostic assay cartridge into a module or removal of spent cartridges from a module). In some embodiments, the array support is controlled to rotate in larger increments that skip one or more adjacent columns, which may promote more even distribution of loaded modules. The load/unload times for cartridges is short, given the large number of modules (typically 4 rows×25 modules/row), a module having an empty bay for loading or a module having a spent cartridge for unloading will arrive at one of the elevators in short order. Indeed, the entire array of 100 modules can be loaded in approximately 10 minutes.

In some embodiments, the diagnostic assay modules have a communications subsystem that can include a diagnostic component. A processor can be communicatively coupled with the communications subsystem and the diagnostic component. The processor can be configured to cause the diagnostic assay module to wirelessly receive, using the communications subsystem, a command from a mobile device. The processor can also be configured to wirelessly send, using the communications subsystem, a module command response to the mobile device. The processor can also be configured to conduct a test using the diagnostic module. The processor can also be configured to wirelessly send, using the communications subsystem, encrypted diagnostic information (e.g., medical information), indicative of a result of the test, to a remote server.

FIGS. 2A-2E illustrates the process of a technician loading diagnostic assay cartridges 10 in a high throughput handling system 100 for processing within diagnostic assay modules 30 of the array and removing spent cartridges from the system 100.

Figure 2A:
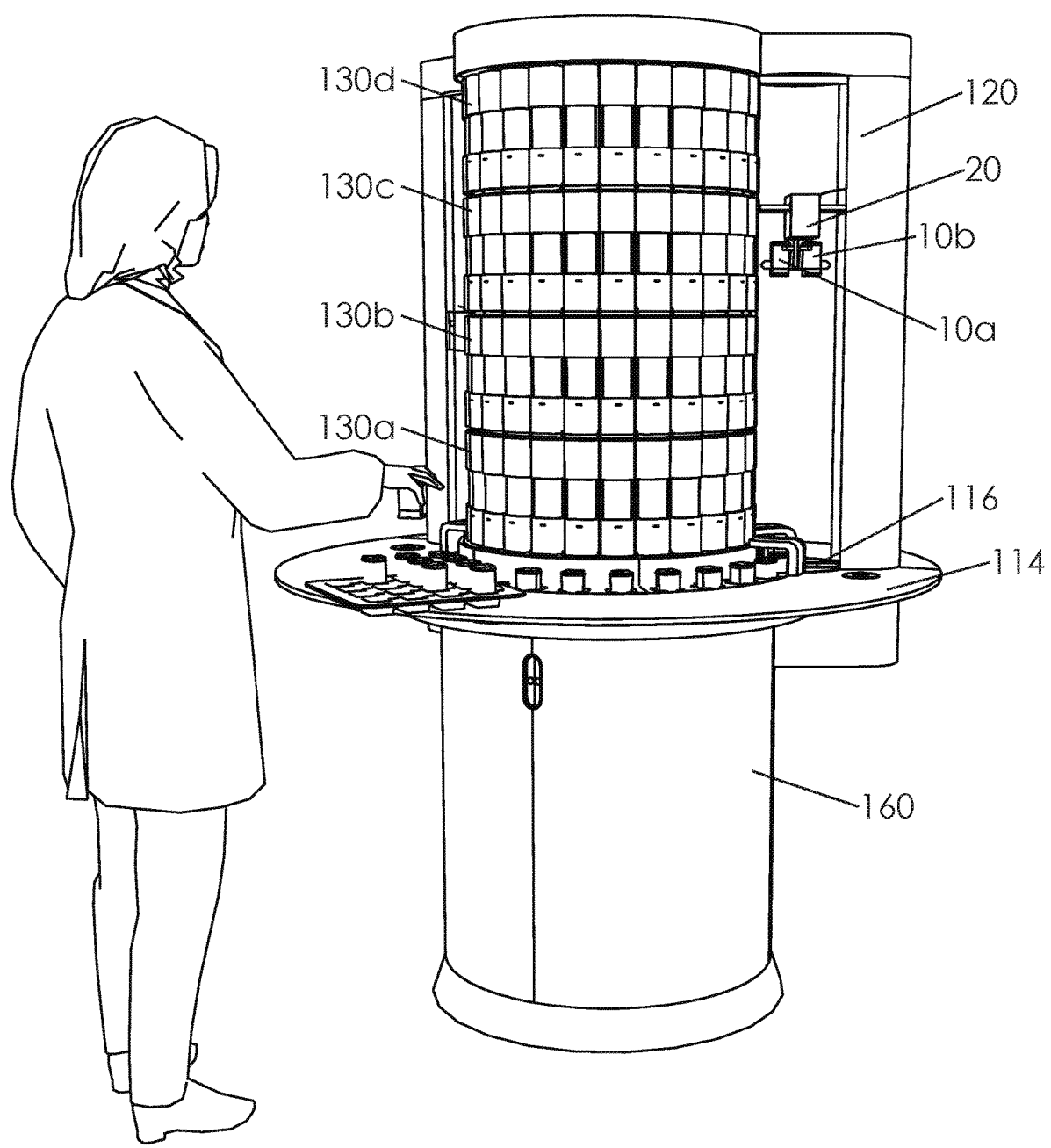
FIGS. 2A-2B depict a lab technician placing diagnostic assay cartridges in queue for processing within a high throughput handling system having an array of diagnostic assay modules, in accordance with some embodiments.

In FIG. 2A, the technician places individual cartridges 10 to be processed within recesses of the loading track 110 of system 100 while the loading track incrementally rotates toward elevator 120. Loader 20 is lowered along vertical elevator 120 and grasps a cartridge 10*a* to be tested. In some embodiments, the elevator includes a sensor that senses when a cartridge is ready to be picked up such that a central controller can direct the loader 20 to grasp and hold the cartridge 10*a* from the loading track 110. If any of the modules 30 within any of array rows 130*a*, 130*b*, 130*c*, 130*d*, are empty, the controller commands the loader 20 to translate along the elevator to any row having an empty module 30. Loader 20 then loads the diagnostic assay cartridge 10*a* into the respective module. In this embodiment, the loader is configured to flip or rotate such that the loader can hold a pair of cartridges simultaneously. Such a configuration further improves speed and efficiency since after loading of cartridge 10*a*, the loader can flip to load the other cartridge, or could be used to remove a spent cartridge 10*b* before loading of cartridge 10*a*. To discard spent cartridge 10*b*, loader 20 lowers and releases spent cartridge 10*b* above waste chute 116 to be collected in a waste receptacle stored in base 160. If there are no spent cartridges to remove, the dual sided loader 20 could be used to pick up two cartridges 10*a* to be loaded for sequential loading into empty modules 30 and/or the dual sided loader could be used to pick up two spent cartridges from two modules 30 for disposal.

In some embodiments, the controller commands the loader to translate to the nearest empty module, although in other embodiments, the controller commands the loader to translate to a module to distribute the cartridges more uniformly within the respective modules of the array. In some embodiments, the controller commands the loader to only pick up cartridges for a particular assay. In some embodiments, assays of a particular type are all loaded onto a particular row of the array. In some embodiments, the controller commands the loader according to a number of factors, which may be combined or weighted according to various differing objectives or combinations of objectives. Such objectives include, but are not limited to: proximity, temperature, load balance, heat balance, distribution among levels or within a respective level, time length of assay, or any combination thereof. In some embodiments, the system can determine a preferred module, a preferred level of a particular array, or a preferred array for loading of a cartridge based on one or more objectives or factors, including but not limited to any of those described herein.

Figure 1G:
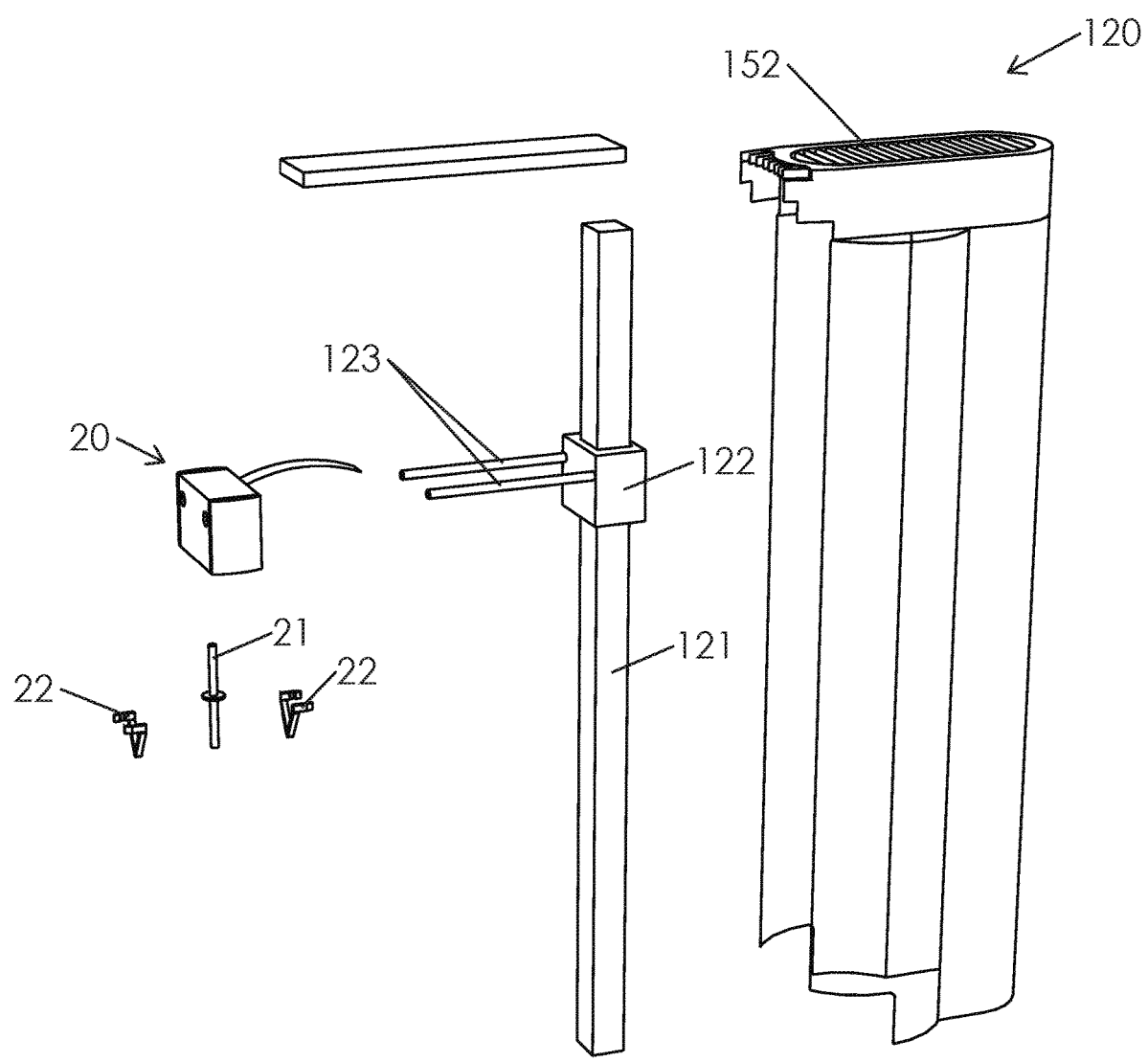
FIG. 1G shows an exploded view of an elevator assembly of the high throughput handling system of FIG. 1A, in accordance with some embodiments.
Figure 1H:
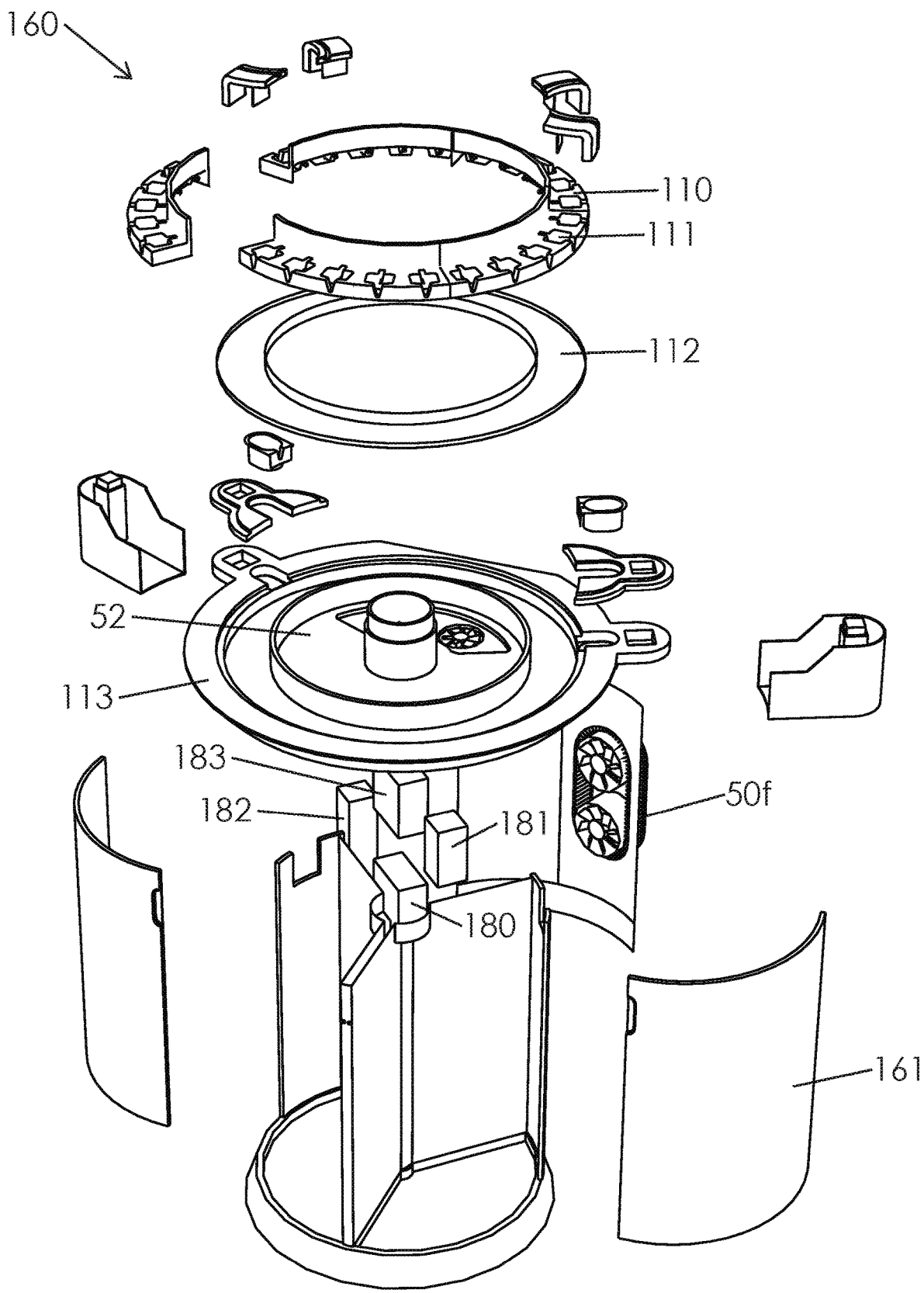
FIG. 1H shows an exploded view of a base and loading tracking of the high throughput handling system of FIG. 1A, in accordance with some embodiments.
Figure 2B:
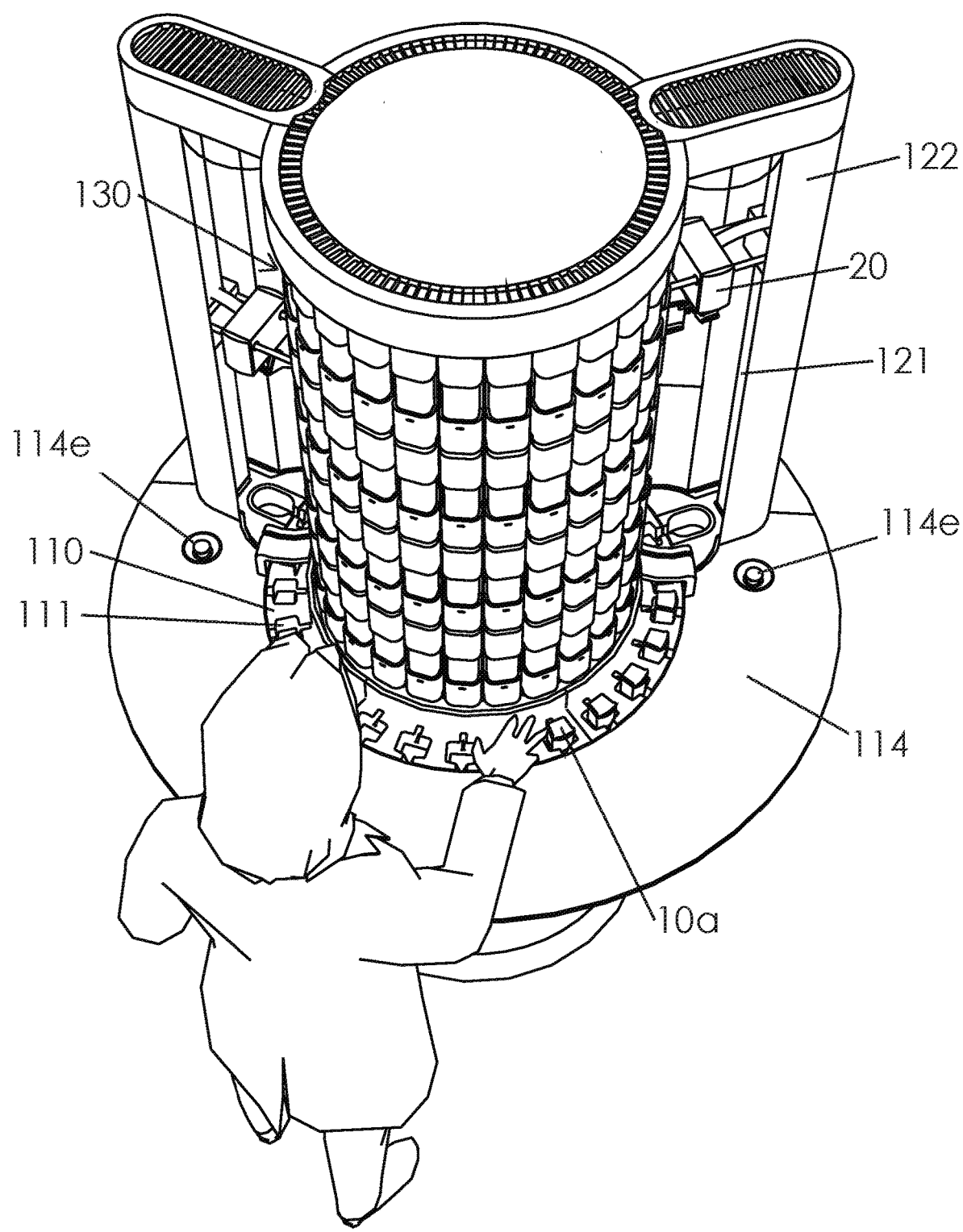

FIG. 2B shows another view of the technician loading diagnostic assay cartridges 10*a* to be processed onto the loading track 110. In addition, a pair of emergency stop buttons 114*e* are disposed on the countertop 114. It is appreciated that one or more emergency stop features could be included on various other portions of the system in the alternative or in addition. As can be seen, loading track 110 can include recesses 111 adapted to receive the cartridges. In any of the embodiments herein, the loading track can be continuous and/or recirculating. Loading track can be defined as multiple components that fit into a rotating ring 112 of main casting 113, which can be seen in the exploded view of base shown in FIG. 1H. Some embodiments could utilize any type of recirculating track configured to receive multiple cartridges. Such tracks could include a non-linear track, as shown, or a linear track having a recirculating surface (e.g. conveyor belt). Such tracks can include a cartridge receiving surface, which could include any of a recess, a protrusion, a coupling feature, a hook, magnet, or any feature suited to receive a cartridge and optionally maintain the cartridge in a particular orientation. Alternatively, the track could receive the multiple cartridges in any orientation, and the orientations are subsequently adjusted by an adjustment feature (e.g. gripper, orienting features, interfacing surfaces, or any suitable mechanism). In some embodiments, the loading track could include independently movable carts, each configured to support one or more cartridges. In some embodiments, the system includes at least one emergency stop button located on the counter, which shuts off power to the loading track and the elevators. In the embodiment shown in FIG. 1H, loading track includes recesses 111, each recess dimensioned to receive a respective cartridge. Recesses 111 are specially contoured so as to receive the cartridges in a proper location and orientation to facilitate grasping of the diagnostic assay cartridge by loader 20. In some embodiments, this can be accomplished by use of interfacing features (e.g. hole/pegs), or protrusion or ridges that constrain the cartridges in the proper location and orientation. In some embodiments, the track is a continuous molded structure. In some embodiments, the holders for the cartridges are not connected and are individually separated, where each holder contains only a single cartridge. In some embodiments, the holders are arranged in small groups to hold a subset of cartridges (e.g. 2, 3, 4, 5, 6, 7, 8, 9, 10 or more cartridges). In some embodiments, the cartridge holders can be removed from the track for filling with cartridges away from the system and the filled rack can then be placed on the track for loading onto the array. In some embodiments, the system is configured to select certain cartridges from the recirculating track for loading into the array while allowing other cartridges to recirculate for one or more passes by the loader for subsequent loading into the array. Such selection can be determined based on data obtained from the cartridge so as to prioritize loading based on one or more factors, including but not limited to, any of: rush status, sample ID, type of sample, type of assay, and an assay length.

Figure 2C:
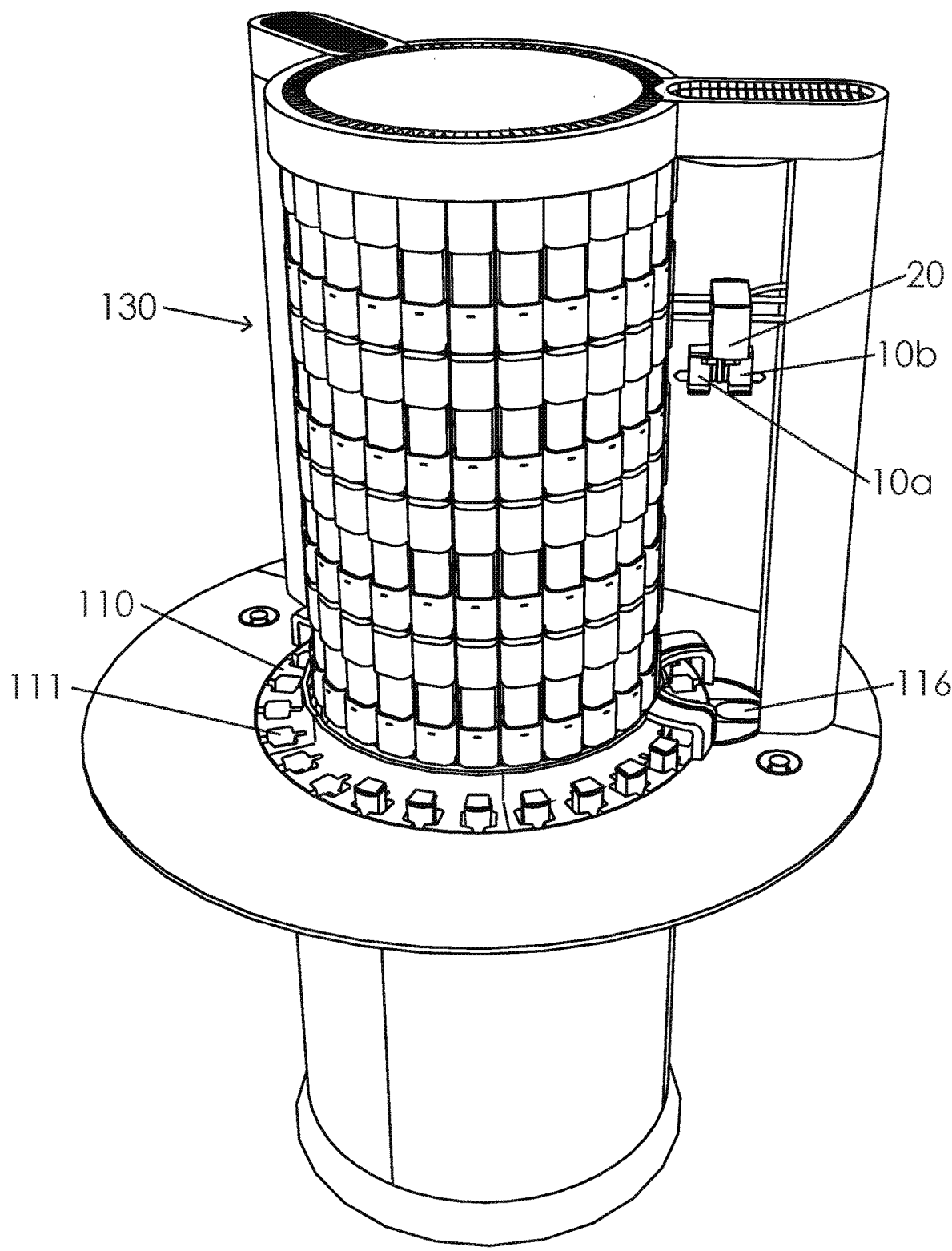
FIG. 2C shows a pair of diagnostic assay cartridges held within a grasper being lifted in an elevator of the system to facilitate placement of one of the cartridges within a diagnostic assay module of the array, in accordance with some embodiments.
Figure 2D:
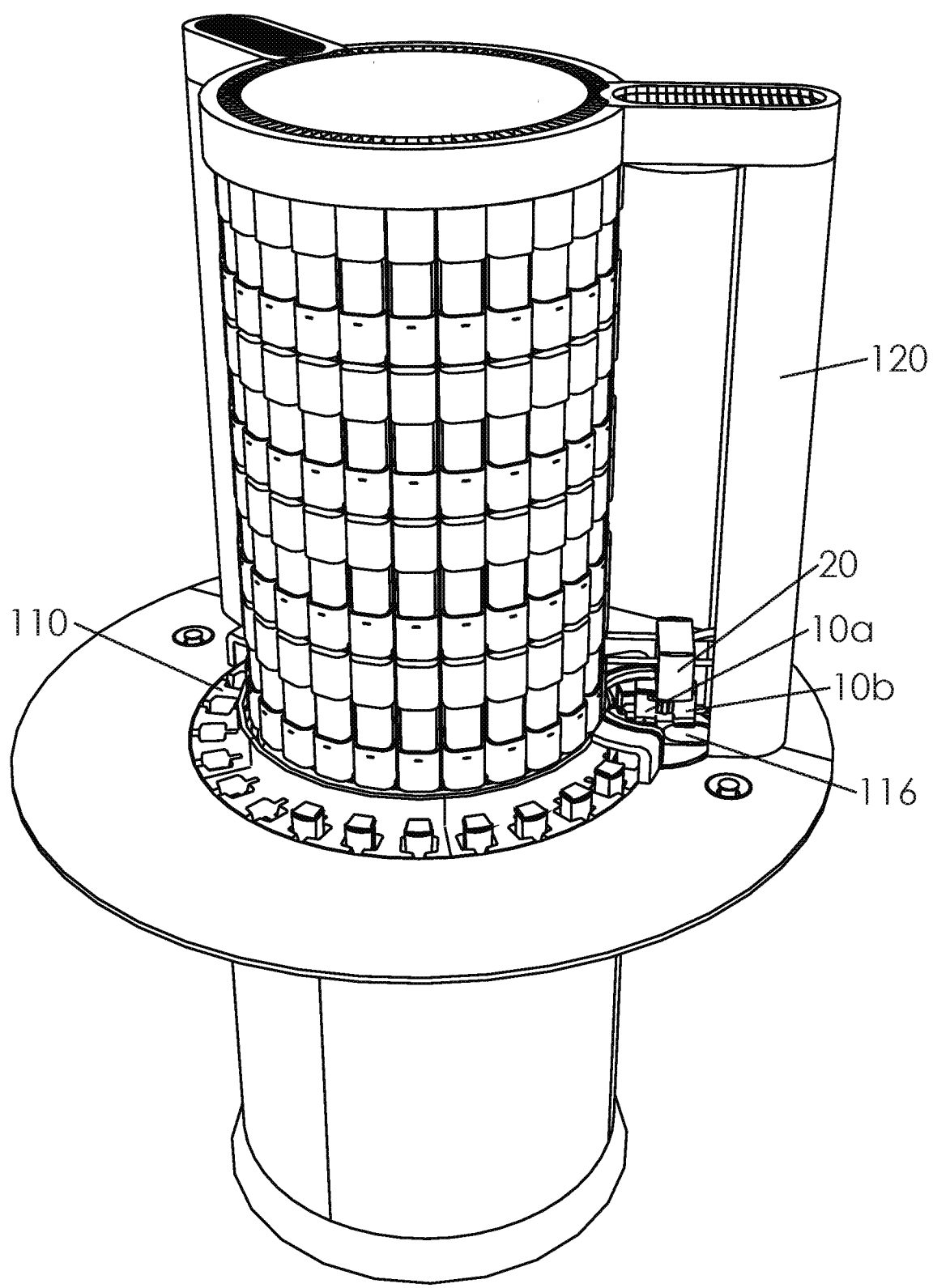
FIG. 2D shows a pair of diagnostic assay cartridges held within a grasper being lowered in the elevator to discard a spent cartridge, in accordance with some embodiments.
Figure 2E:
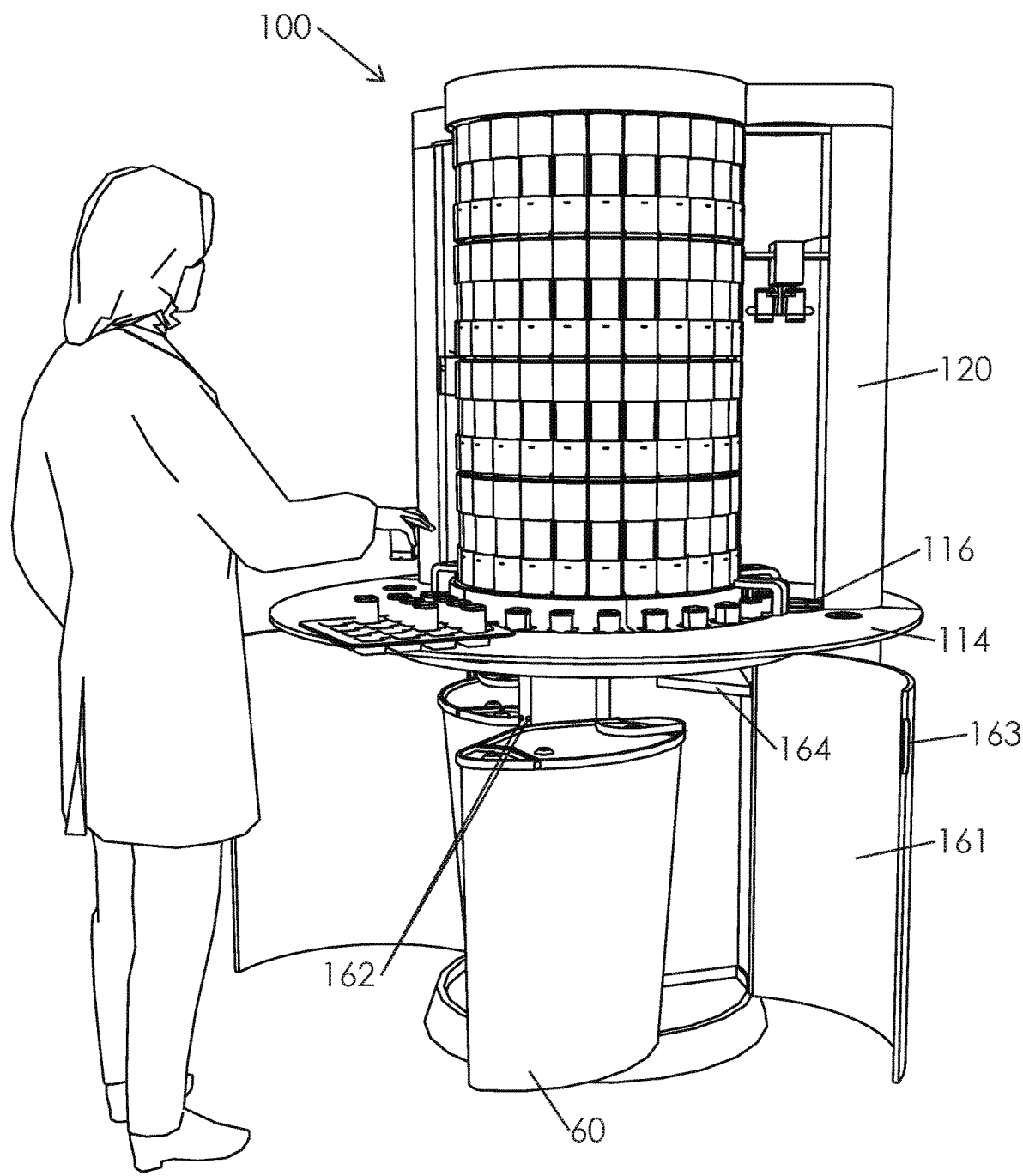
FIG. 2E depicts a technician placing a diagnostic assay cartridge in queue in the loading track and removing a waste receptacle from a base of the system filled with spent cartridges, in accordance with some embodiments.

FIG. 2C shows another view of the loader 20 grasping cartridges 10*a*, 10*b*. As can be seen, the loader 20 can be translated along elevator 120 to any row of the array 130 and can discard cartridge 10*b* by lowering and releasing the cartridge into waste chute 116, as shown in FIG. 2D. FIG. 2E shows a technician loading cartridges 10 into the loading track 110 and in the process of removing waste receptacle 60 by opening base doors 161, the waste receptacle 60 having been positioned beneath waste chute 116 within the base 160 to collect spent cartridges. Receptacle 60 can be easily removed for cleaning. In some embodiments, the base 160 includes a waste receptacle excluder 164 designed to prevent insertion of the waste receptacle 60 if the correct flap is not opened and snapped into place.

One particularly advantageous aspect of the above-described cylindrical array configuration is that the array support assembly 130 can be defined to have dimensions suitable for transporting the array through a standard sized doorway. This allows system 100 to be set up in virtually any suitable location and does not require an oversized entry, as do many conventional large-scale analysis systems. In addition, the cylindrical array configuration allows for a substantially reduced footprint, which allows the system to be used in a variety of locations since it does not require an inordinate amount of floor space, as do many conventional systems. In some embodiments, the system 100 (without the counter) has a width of about 34" or less and a height of about 74" or less. These dimensions substantially maximize the capacity of the array assembly while still allowing the system to be easily transported through a standard doorway, typically 80" high by 36" wide, even when lifted off the floor by 1-2" such as by a wheeled transport cart. The dimensions of base 160 are well within suitable limits for transport through a standard doorway. The circular counter 114 that sits between base 160 and array 130 can be removed and transported vertically if needed, for example, to reduce the overall width to allow passage through a standard doorway. In some embodiments, the internal crate and packaging used to support the instrument during shipping can be used as a transport cart to move the instrument to its final destination in the laboratory or hospital setting. In some embodiments, the internal crate and packaging that is also used as a transport cart is constructed of wood. Exemplary size dimensions can be further understood by referring to FIGS. 3A-3D below.

Figure 3A:
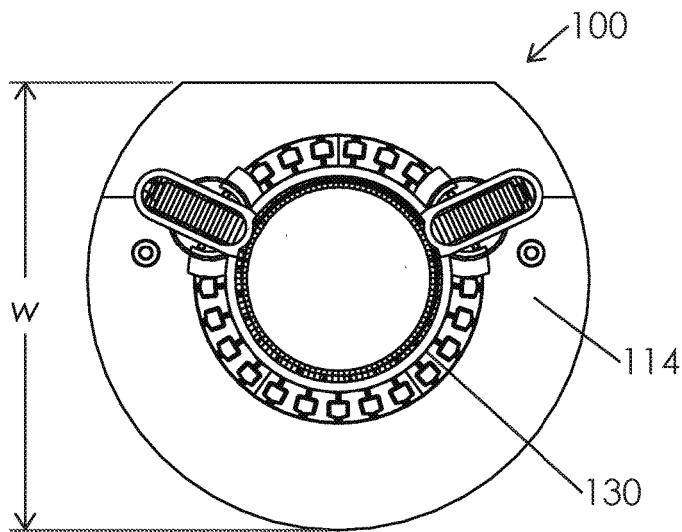
FIG. 3A-3C depict top and side views illustrating the relative dimensions of the array assembly and base that allows for transport of the array assembly with countertop removed through a standard sized doorway, in accordance with some embodiments.
Figure 3B:
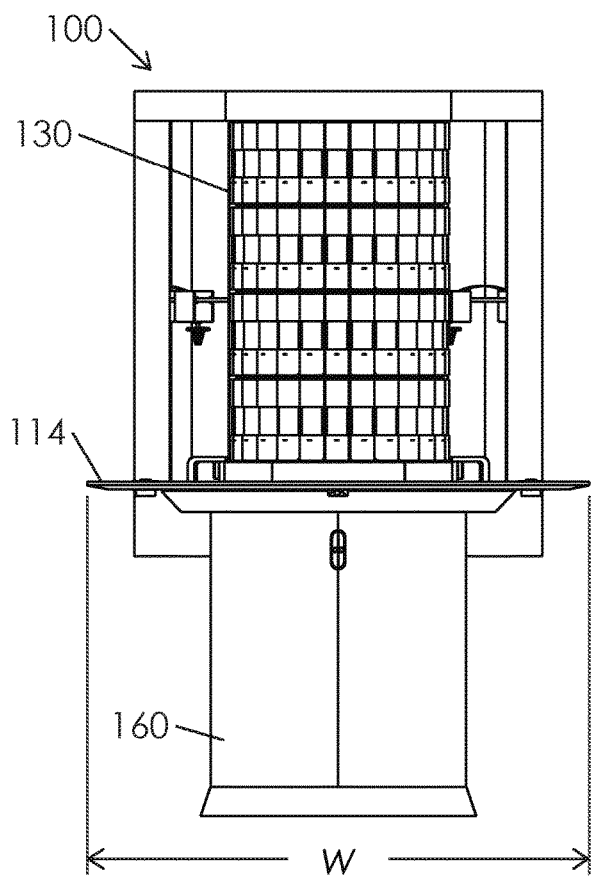
Figure 3C:
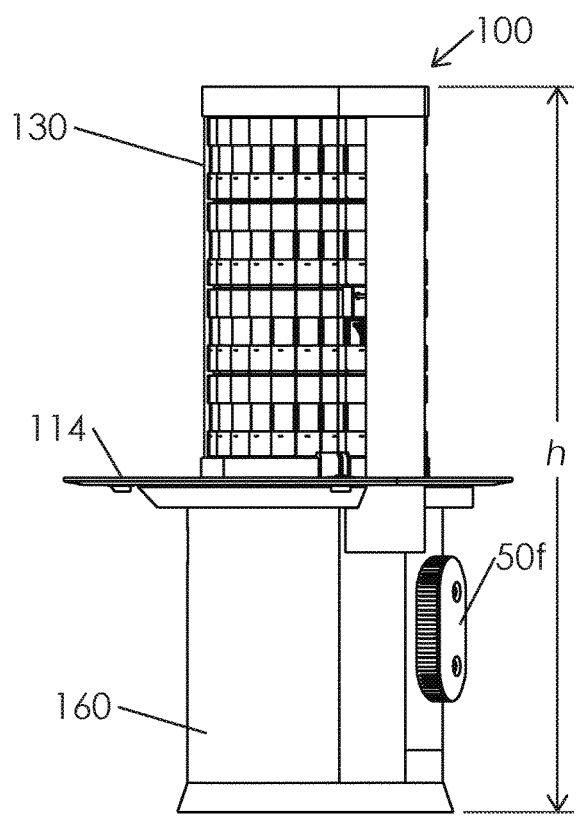
Figure 3D:
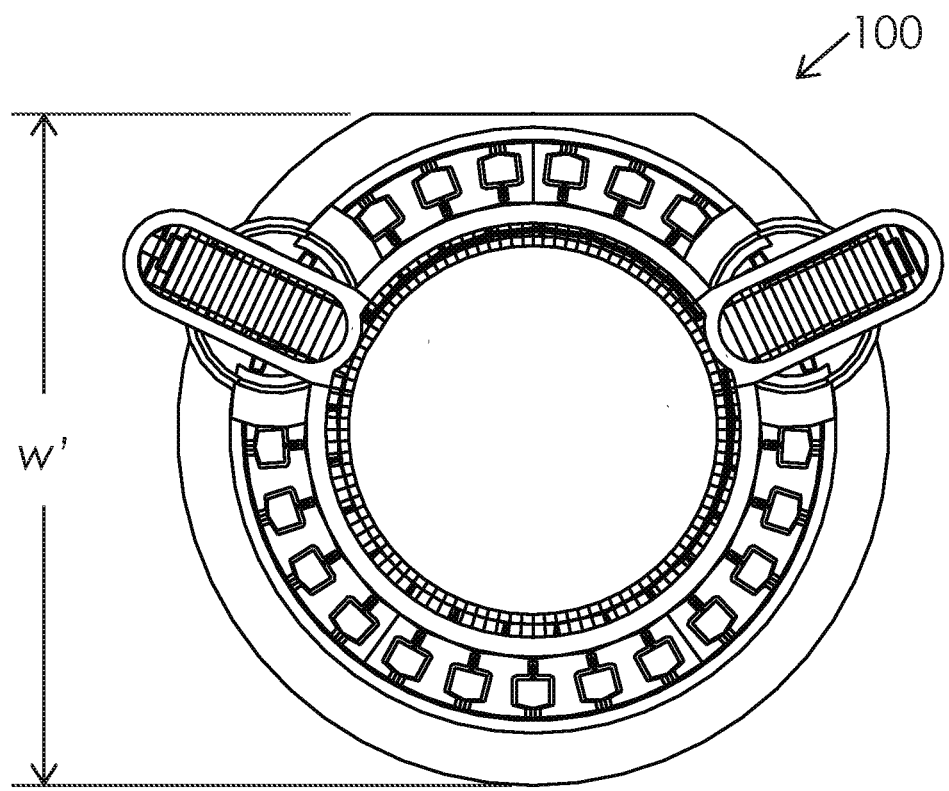
FIG. 3D shows an overhead view of the array assembly with the counter removed, in accordance with some embodiments.

FIG. 3A-3C depict top and side views illustrating the relative dimensions of the array assembly. As seen in FIG. 3A, the system 100 with the counter attached has a minimum width, w. In this exemplary embodiment, w is about 45.5". As can be seen in FIG. 3B, the maximum width, W, occurs along the counter 114. In this embodiment, W is about 51". As can be seen in FIG. 3C, the system 100 has an overall height, h. In this embodiment, h is about 74". As described previously, the counter can be removed to facilitate shipping and transport of system 100 through a standard sized doorway. As can be seen in FIG. 3D, in this embodiment, the system 100 with the counter removed has a reduced width, w'. In this embodiment, w' is about 34" which allows the system 100 to easily fit through a standard sized doorway. Although advantages of certain dimensions have been described herein, it is appreciated that other embodiments could include a similar system or components with various other dimensions in accordance with any of the concepts described herein. Advantageously, the counter 114 and loading track are such that the system can be accessed from all sides (e.g. 360 degrees) such that cartridges can be loaded by one or more personnel approaching from multiple directions. It is appreciated that in other embodiments, the counter 114 and loading track can be configured such that access is from less than 360 degrees (e.g. 270 degrees, 180 degrees, or less). As shown, in FIGS. 3A and 3D, the countertop 114 and system 100 can be configured with a generally circular shape with one flattened side. This allows the system to be placed against a wall if needed. It is appreciated that the system and countertop, however, could be configured in any shape with or without a flattened side, including circular, polygonal (e.g. square, hexagonal, etc.) or any regular or irregular shape desired.

Figure 3E:
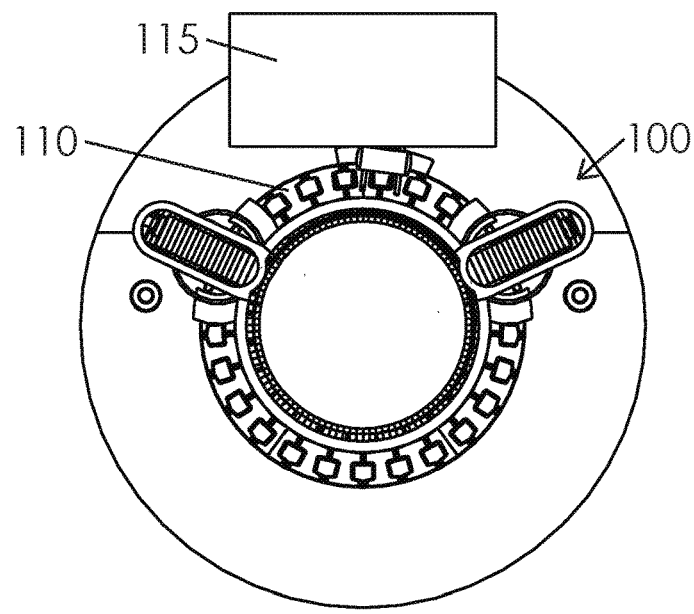
FIGS. 3E and 3F show an overhead and side view, respectively, of a high throughput handling system with a cartridge preparer that prepares and automatically loads prepared diagnostic assay cartridges onto the loading track, in accordance with some embodiments.
Figure 3F:
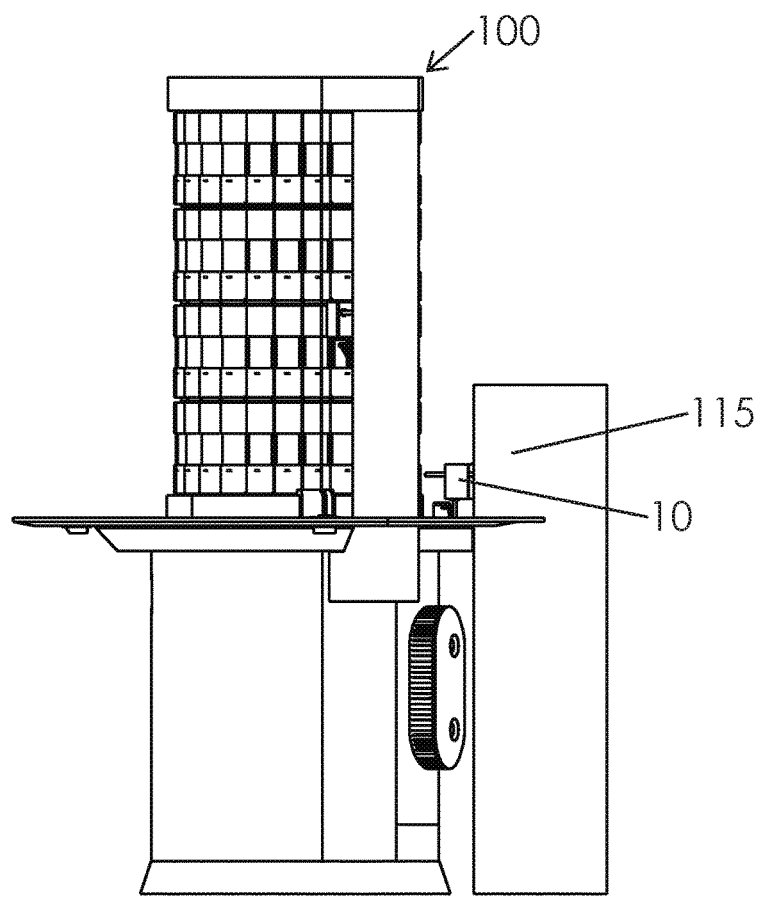

In some embodiments, the system can further include an automated cartridge preparer, which can be configured to perform one or more pre-analytic steps that can include such processes as adding the biological sample to be tested to the cartridge, closing the cartridge lid and preparing the cartridge for loading onto the array. By use of a cartridge preparer, wear and tear on the modules affixed within the array can be further reduced, as can technician time which is typically used for pre-analytic cartridge processing. The cartridge preparer can be further configured to position a diagnostic assay cartridge within the loading track of the system after performing the pre-analytic processing. FIG. 3E shows an exemplary embodiment in which system 100 includes cartridge preparer 115 positioned adjacent the loading track 110. As can be seen in FIG. 3F, cartridge preparer 115 can include a cartridge loader for positioning a prepared cartridge 10 within loading track 110. It is understood that the sample loader of the cartridge preparer 115 can include similar mechanisms as those described in the array elevators, or any suitable mechanisms as would be known to one of skill in the art.

Figure 4:
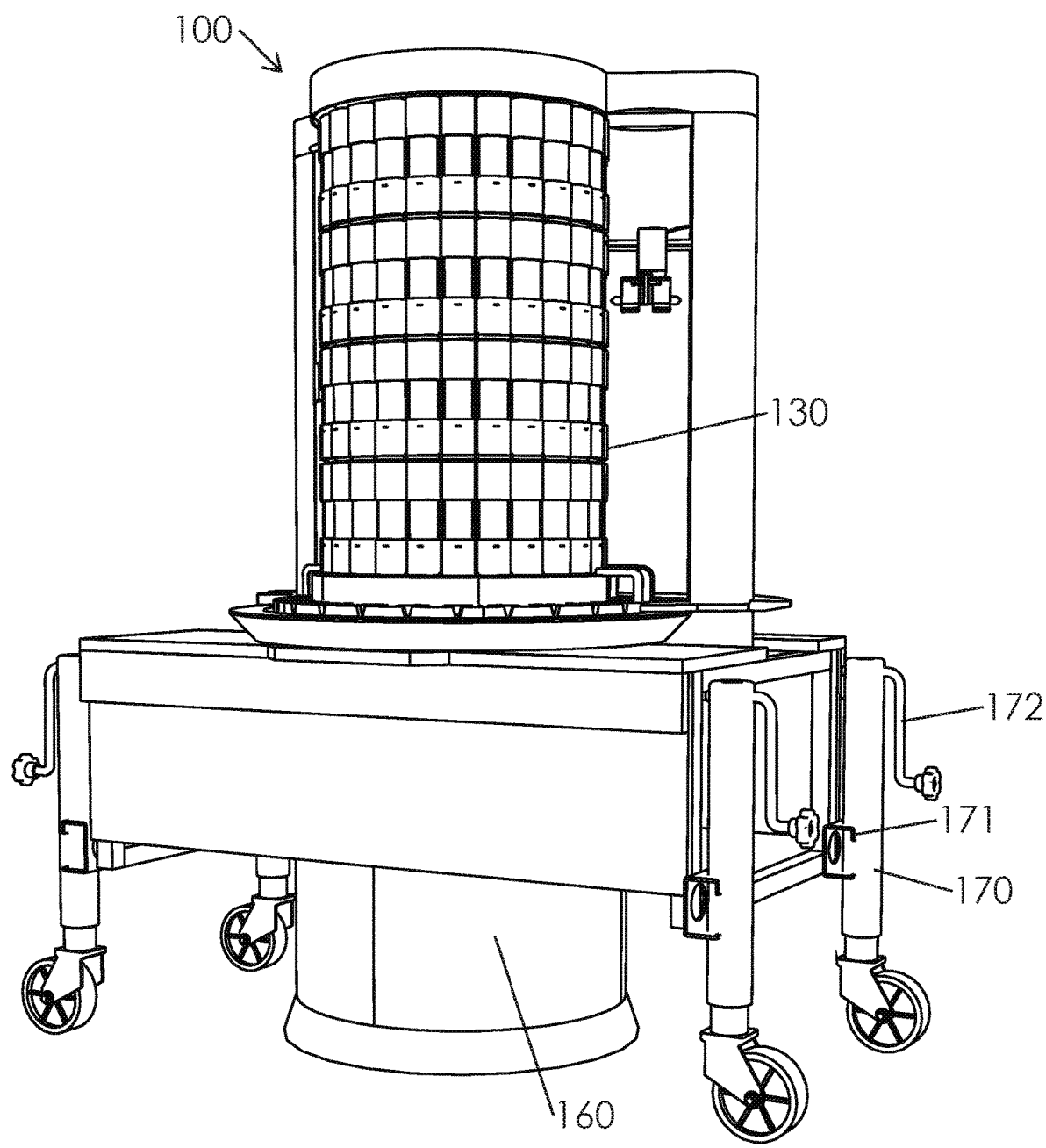
FIG. 4 illustrates a high throughput handling system with an adjustable height transport cart supporting the removable array assembly from the base of the system, in accordance with some embodiments.

In some embodiments, system 100 can include a transport cart 170 to facilitate transport and assembly of system 100 at a desired location. As shown in FIG. 4, the transport cart 170 can include a lifter 171 controlled by crank 172, multiple cranks or other such user control mechanisms, which may include hydraulic, electrical, pneumatic, control or lift mechanisms to allow the system 100 to be lifted off the ground and wheeled into a room. The transport cart 170 provides a more stable manner in which to move the system 100, which may be preferable given the small footprint and relative height of the system. This approach is advantageous as it allows the array assembly 130 to be delivered and transported to its destination as a substantially assembled unit despite its considerable weight and dimensions. The removable counter can then be mounted to the system once it is delivered to its final destination. Typically, the base and array assembly are securely and fixedly attached one another. In some embodiments, the array assembly can be removed from the base to facilitate shipping or transport and can be assembled on-site. In some embodiments, the base can include wheels to allow the system to be moved or transported without any transport cart.

Figure 5:
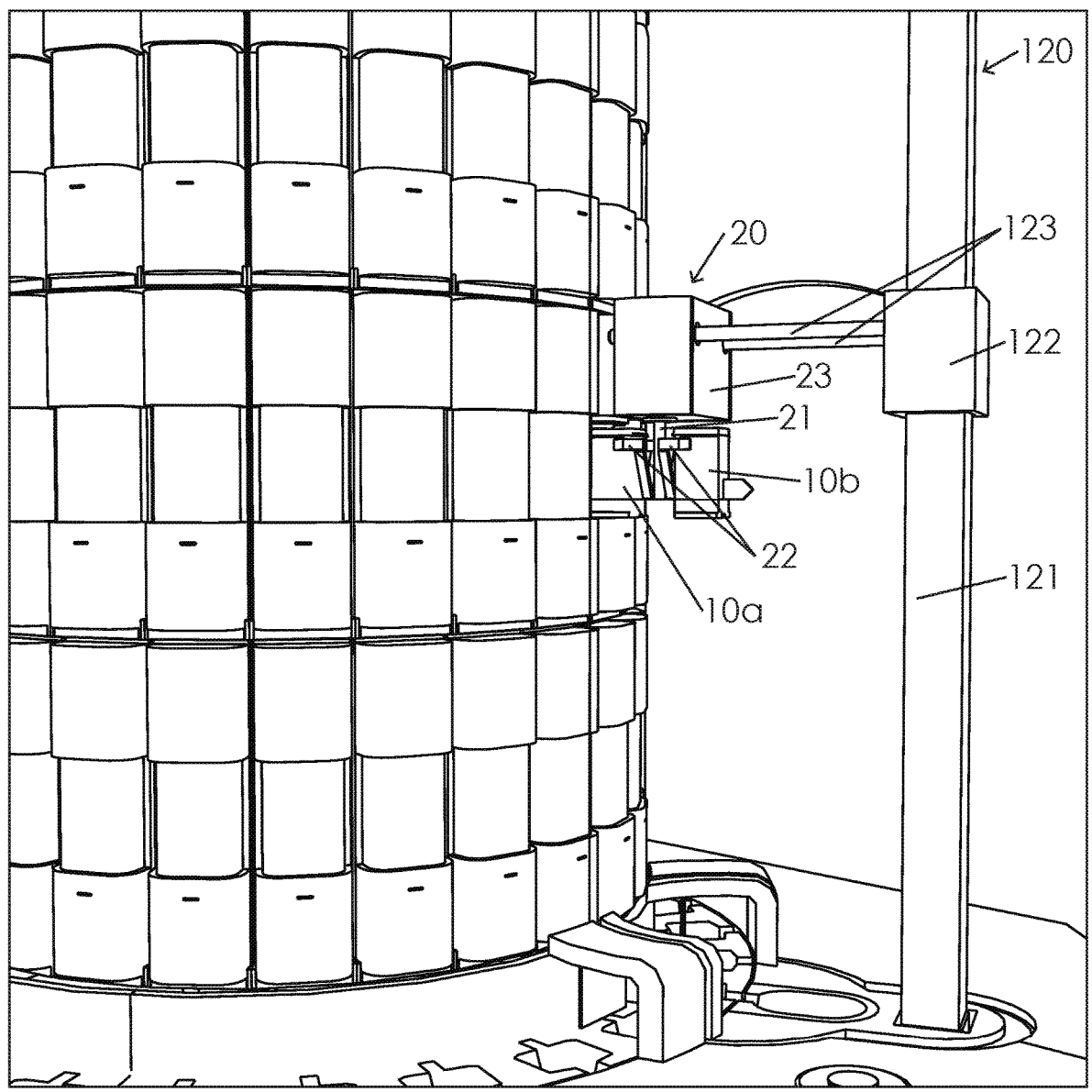
FIGS. 5-6 illustrate detail view of the elevator and loader for grasping a pair of diagnostic assay cartridges to facilitate loading and/or unloading from the diagnostic assay modules of the array, in accordance with some embodiments.
Figure 6:
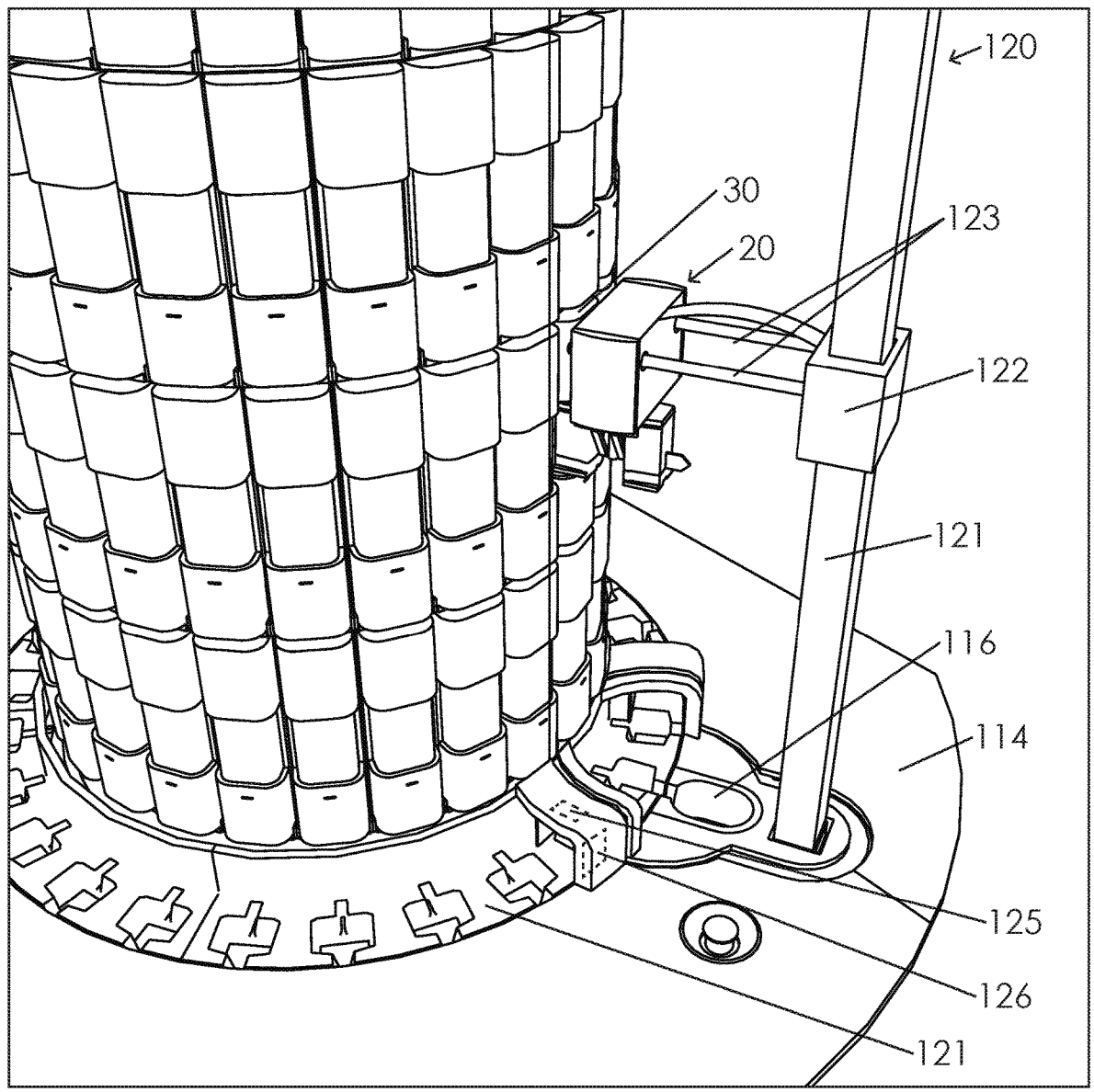

FIGS. 5-6 depict detailed views of the cartridge loader 20 in elevator 120. As shown in FIG. 5, elevator 120 includes a track 121 which guides vertical movement of a vertical carriage 122, which is powered and controlled by the central controller in response to sensors and/or determination of empty modules 30 or spent cartridges based on communication with the modules 30. In this embodiment, loader 20 includes two graspers 22, each having a pair of contoured jaws that are spaced apart to grasp the outer edges along the front face under the automation flange of each cartridge 10, as shown. The two graspers 22 extend from a central member or shaft 21 that is rotationally or pivotally coupled to a horizontal carriage 23 that translates along a pair of rods 123 extending from vertical carriage 122 towards the array 130. Movement of the horizontal carriage in combination with movement of the grasping jaws allows the loader to pick up each diagnostic assay cartridge to be loaded as well as place the cartridge 10 within a receptacle bay of a respective module 30. Movement of the horizontal carriage 23 towards track 121 also allows loader 20 to align any spent cartridges above the waste chute 116 to be discarded, as shown in FIG. 6. These components can be further understood by referring to the exploded view in FIG. 1G.

Elevator 120 can further include one or more sensors for detecting proximity of an approaching diagnostic assay cartridge in the loading track and obtaining data from the cartridge before loading. For example, as shown in FIG. 6, a proximity sensor 125 disposed within the entry into elevator 120 detects the approaching cartridge, which signals to the elevator to pick up the cartridge. In addition, a data sensor (e.g. NFC sensor) detects an ID of the diagnostic assay cartridge and a diagnostic assay protocol for the cartridge, which in some embodiments, can be used to determine where the cartridge should be loaded onto the array. In some embodiments, an NFC sensor is used to identify a given cartridge. In some embodiments, the sensor used to detect the diagnostic assay cartridge can employ optical recognition technology (bar codes, QR codes), RFID tags, and infrared (IR) detection. Additional sensor detection methods will be well known to persons of skill in the art.

Figure 7:
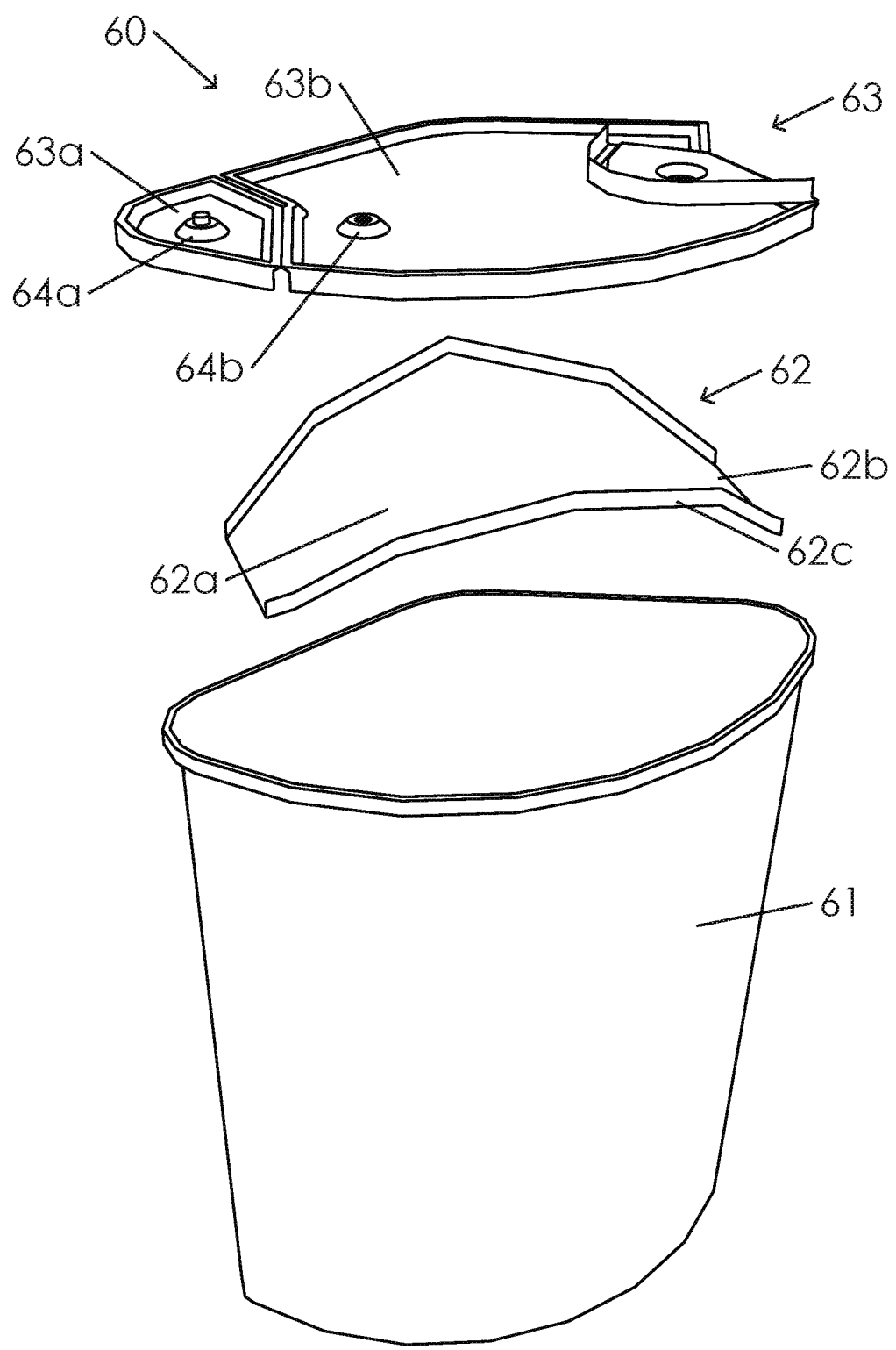
FIG. 7 illustrates a specialized waste receptacle adapted for use with a high throughput handling system to collect spent cartridges that includes an optional lid and diverter, in accordance with some embodiments.

FIG. 7 depicts an exemplary waste receptacle 60 adapted for use with the above-described system. Waste receptacle 60 is specially shaped to fit within base 160 so that a narrowed portion extends under waste chute 116. In some embodiments waste receptacle 60 includes a main receptacle body 61 that can be formed in various other shapes, e.g. square, round, oval, etc. Waste receptacle 60 is typically formed of a rigid polymer and can be formed so as to be suitable for reuse or to be disposable. In some embodiments, waste receptacle 60 further includes a lid 63 that includes end flaps 63a that are adapted to fold upward against main portion 63b. End flaps 63a can further include coupling feature 64a that interfaces with a corresponding coupling feature on 64b so as to hold the respective end flap in the upwardly folded position, which allows a sufficient opening for spent cartridges to be directed into the waste receptacle while the lid remains on top of the waste receptacle 60. In some embodiments, a waste receptacle can include an excluder that prevents the waste receptacle from being inserted into base 160 if the correct flap is not opened. Such a lid is particularly useful since some diagnostic assays are performed on biological fluid samples that may contain biohazardous material (e.g. infectious waste or hazardous chemicals) such that contact with the spent cartridges should avoided or minimized.

After the waste receptacle 60 is sufficiently filled, it can be removed from base 160 and the end flap 63a can be folded downward and the entire lid secured and/or sealed against the outer edge opening of the waste receptacle so that the contents can be discarded within the sealed receptacle without having to empty the waste receptacle or transfer the contents. In some embodiments, the waste receptacle can include a diverter 62, which can include angled portions 62a, 62b so as to direct any discarded cartridges into the waste receptacle. In some embodiments, the waste receptacle can include dividers or can use one or more disposable bags such that the diverter can keep spent cartridges deposited through a first opening separate from spent cartridges deposited through a second opening on the opposite end. Diverter 62 could further include a lip or ridge 62c along one or more sides so as to inhibit prevent any leakage or residue from spent the cartridges.

In performing assays, it is desirable and often necessary to maintain an ambient temperature within a suitable range to maintain hardware functionality, assay integrity and improve testing efficiency. In some embodiments, the ambient operating temperature range for the modules is from about 10° C. to about 40° C. In performing sample processing and diagnostic assays concurrently with a large number of modules (e.g. 100 or more), a considerable amount of heat can be created. Further, many such diagnostic assays utilize thermal cycling to amplify the target analyte in the fluid sample, which can further contribute to the overall heat being generated. Since heat rises this can result in a substantial temperature differential between the top-most row of the array 130 as compared to the bottom-most row. Thus, to maintain a suitable ambient temperature for each module of the array 130, system 100 can include an integrated cooling system.

Figure 8A:
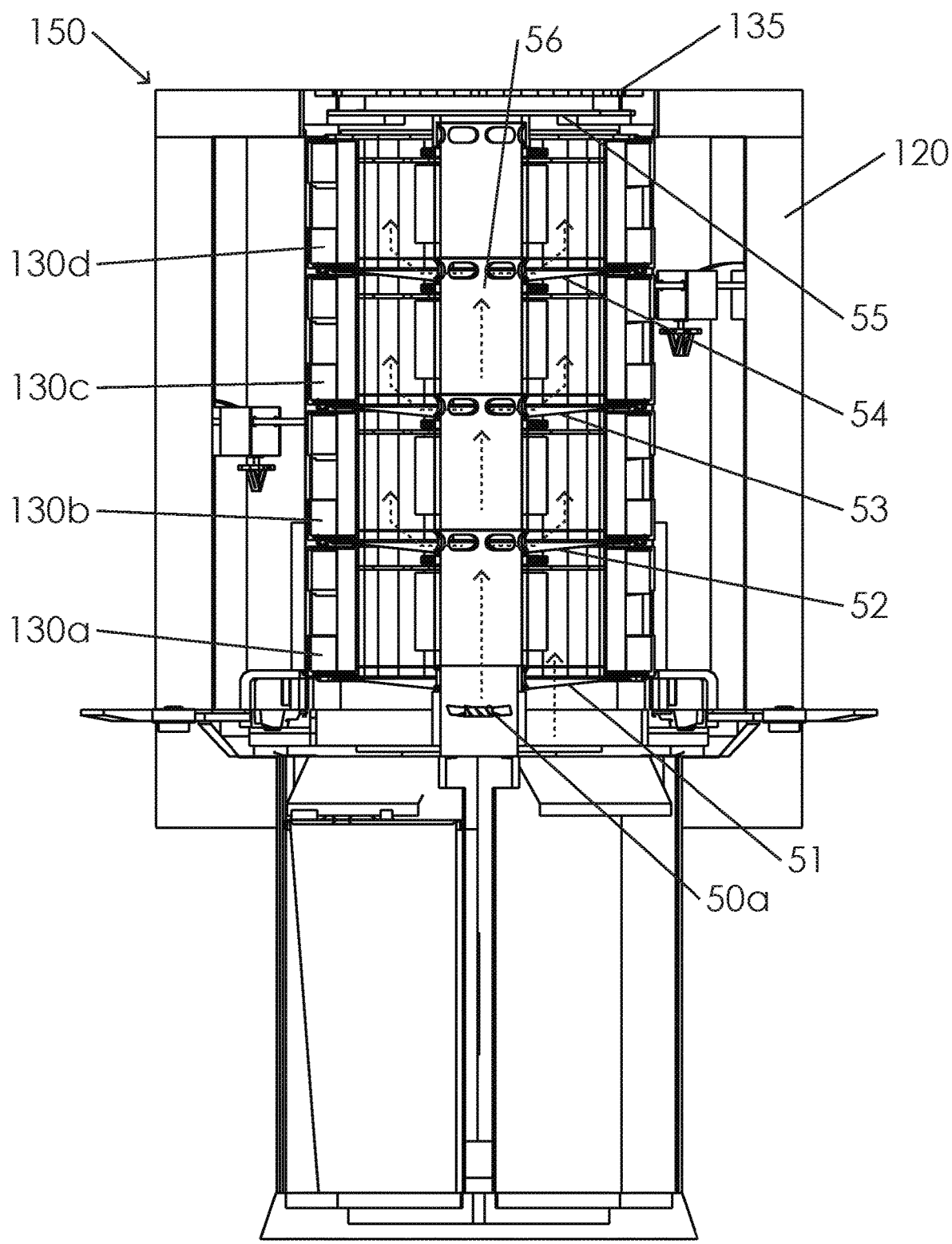
FIG. 8A illustrates a cross-sectional view of the high throughput handling system to illustrate an integrated cooling system to control heat transfer through the array of diagnostic assay modules during operation, in accordance with some embodiments.
Figure 9:
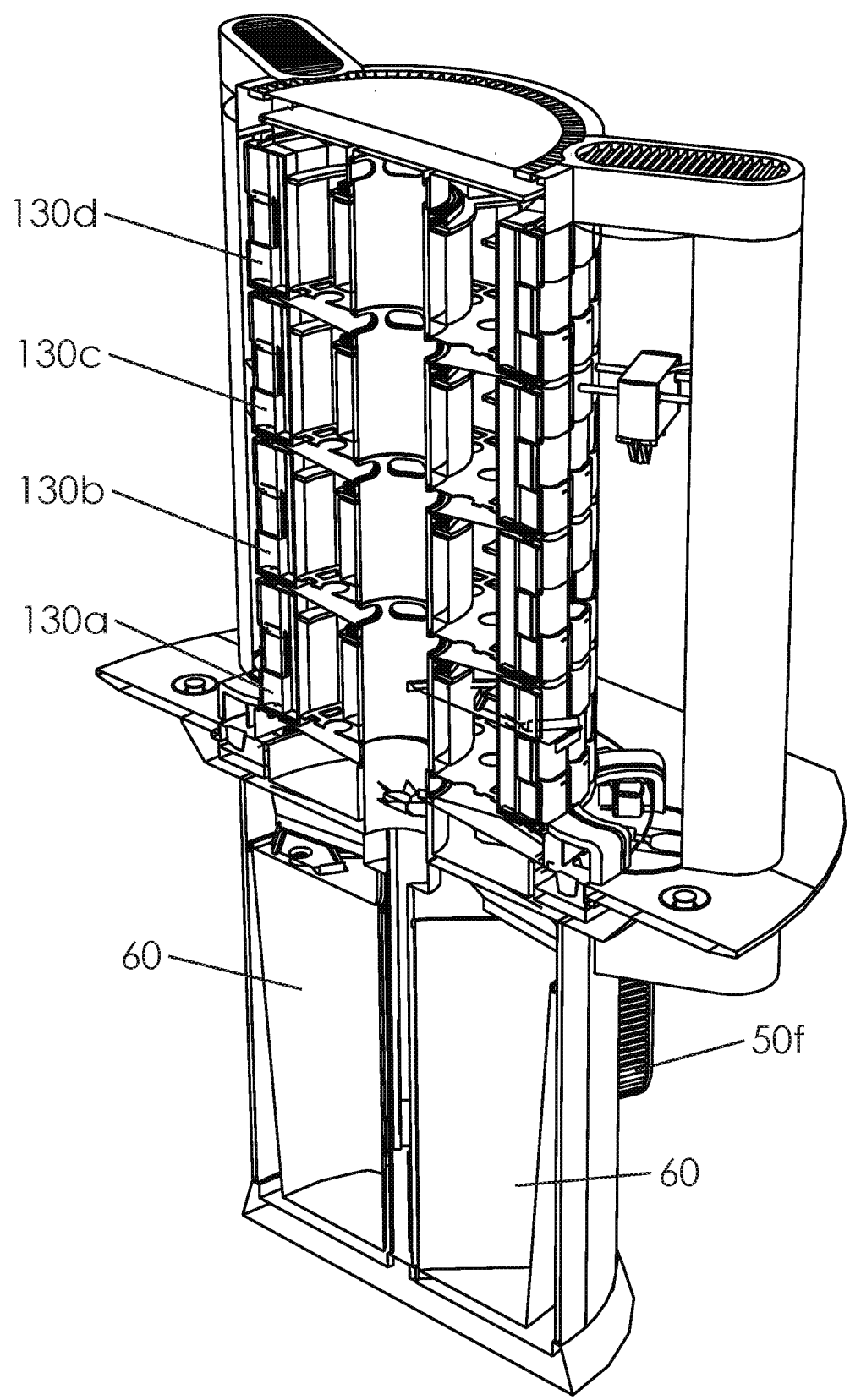
FIG. 9 illustrates a cross-sectional view of the high throughput handling system to illustrate the modular construction of each level of the array, in accordance with some embodiments.

FIG. 8A illustrates a cross-section of system 100, which reveals the design of an internal cooling system 150 incorporated into the structure of the array assembly 130, which is detailed further in FIG. 9. Array assembly 130 is composed of four levels, each having a main circular frame, 130a, 130b, 130c, 130d. Each frame includes features for attaching and securing the module 30 to the respective frame. Each level is further designed such that each level is isolated or baffled from each other level with regard to air flow. The frames can define an open central column through which the longitudinal vertical axis of the frame extends with openings adjacent to each of the modules 30 attached to the frame. Cooling system 150 utilizes this open central column and openings adjacent the modules to force air through the array support assembly 130. The array support assembly 130 is enclosed in an outer cylindrical, transparent outer shell 135, which protects the modules 30 from dirt and debris and allows a microenvironment to be established and allows a positive pressure to be maintained around the array support assembly. In some embodiments, each of elevators 120 can be encased in an outer shell that merges with the outer cylindrical shell 135 such that the inside of each elevator is open to the interior of the cylindrical shell 135. In some embodiments, the elevators are open to air flow on each level and act as "chimneys" for removing hot air from within the array assembly.

Figure 8B:
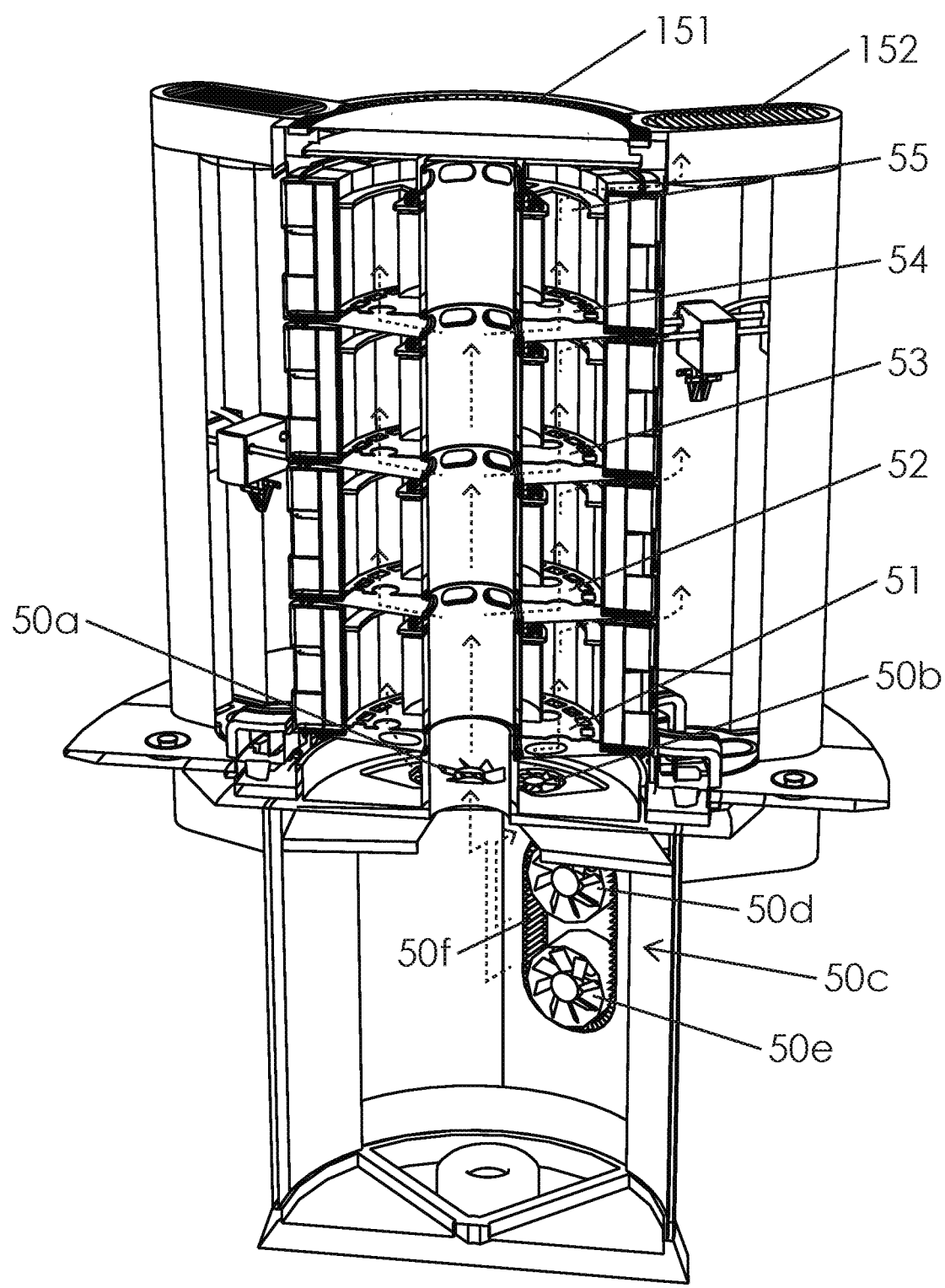
FIG. 8B illustrates a cross-sectional view of the high throughput handling system with a cooling system with intake fans integrated within the base, in accordance with some embodiments.
Figure 8C:
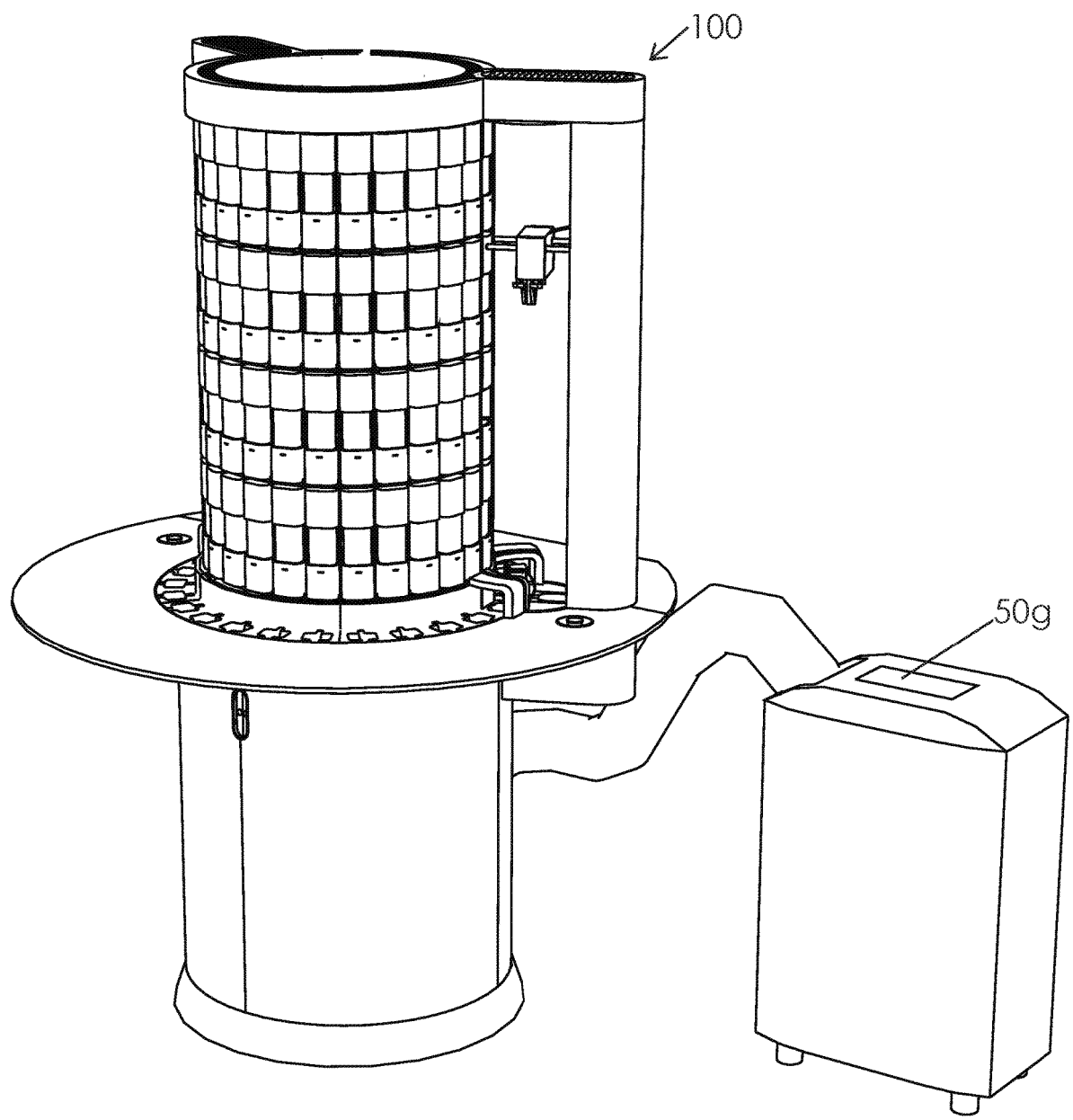
FIG. 8C shows a high throughput handling system with an external air cooler connected to the air intake of the base, in accordance with some embodiments.

One or more cooling fans draw cool air in from the bottom of the array assembly through the open central column and outward through each of the modules 30 before the air travels upwards along the inside of outer shell 135, and within the elevator columns, and outward through a top of the array assembly 135. In some embodiments, positive pressure is maintained within the array assembly, as compared to an ambient environment. In some embodiments, the rate of air flow through the open central column is about 250 cubic feet per minute. The airflow path is shown by the dashed arrows in FIG. 8A. As can be seen in FIG. 8B, a single fan 50a is positioned beneath the open central column and one or more auxiliary fans 50b can be used to provide additional air flow through the lower level. In some embodiments, the first level 130a doesn't receive any air from the open central column since the first air exit holes in the column are above the first baffle 52, thus auxiliary fans 50b can be used to direct air through the first level 130a. In some embodiments, the first exit air holes in the column are below the first baffle 52, thus allowing the first level 130a to receive air from the open column (not shown). System 100 can include a cool air intake 50c that feeds column cooling fan 50a and auxiliary fans 50b with an air supply at a controlled temperature (not shown). Cool air intake 50c can include one or more fans, such as intake fans 50d, 50e and an air filter 50f. In some embodiments, for example systems having between 50 and 200 modules, this configuration allows an optimal temperature range to be maintained in the microenvironment of the array so long as the air intake is about 70° F. or less. Thus, in a room with an ambient temperature of about 70° F., an air intake open to the ambient room may be sufficient to maintain a suitable temperature controlled environment for the array, assuming the room has sufficient temperature control (e.g., air conditioning) to maintain an air supply of a consistent temperature. In other embodiments, such as that shown in FIG. 8C, an external cool air supply 50g can be connected to cool air intake 50c, so as to ensure a sufficiently cool air supply regardless of the ambient temperature. Such a configuration may be particularly useful in high temperature or uncontrolled environments.

Since heated air tends to accumulate in the uppermost portion of the array assembly, cooling system 150 can further includes baffles 51, 52, 53, 54, 55 between row levels, that are adapted to direct and control air flow 56 through the assembly. Lower-most baffle 51 extends to the inside of the exterior shell so that the air flow is directed through the open central column and through the modules of the first row. Baffles 52, 53, 54 separate each of the four rows above the first level so that cool air supplied through the open central is supplied directly to each row via the open central column. In some embodiments, baffles 52, 53, 54 are smaller and do not extend entirely to the outer shell 135 so as to allow flow of heated air passed through lower rows to travel upwards along an inside of the outer shell 135 towards the top most opening. Any of baffles 51-55 can include one or more holes to facilitate passage of air flow through the baffle as needed. In some embodiments, the baffles can be configured for level stratification and air management between levels. Top-most baffle 55 blocks the open central column but allows air flow through the inside of the outer shell to direct air flow to exit the system from one or more opening along the top of system 100. A top vent 151 can allow air to exit around the edges and top vents 152 on elevators 120, which allows each elevator to act as a chimney drawing heated air from each of the levels of the array.

In some embodiments, the system includes a temperature controller configured to maintain the environment of the array assembly within range of temperatures suitable for processing of the samples within the modules of the array. In some embodiments, the temperature controller is configured to maintain the temperature of the ambient environment between about 10° C. to about 40° C. so as to be suitable for performing PCR with the diagnostic assay modules. Preferably, the temperature controller maintains the temperature below 40° C. In some embodiments, the range of suitable temperatures is between about 65 and 95 degrees Fahrenheit. In some embodiments, the temperature controller maintains the temperature within a pre-defined delta (e.g. 2 degrees) from a target temperature. In some embodiments the temperature controller maintains the temperature within 1° C. from a target temperature. This improves efficiency of analysis as well as consistency and predictability of analysis time. In some embodiments, the temperature controller is configured to adjust a temperature of an external air cooler that supplies air to the air intake. In some embodiments, the temperature controller is configured to adjust the air flow through the system by adjusting fan speed (e.g. speed up air flow/adjust air flow between levels), as needed in order to facilitate cooling, particularly as the system is nearing capacity. In some embodiments, the airflow through the system can be adjusted between levels such that more air is directed to the levels where temperature is exceeding optimal levels. In some embodiments, the system further includes diverters that can direct air from the open central column to each of the different rows of the array. For example, the diverters can be configured such that each of the four rows of the array each receive about 25% of the air flow from the open central column. In some embodiments, the diverters can be configured such that all of the air flow in the open central column is diverted to a particular row in the array. In some embodiments, each row of the array can receive anywhere from substantially none (0%) of the air flow in the open central column to receiving substantially all (100%) of the air flow from the open central column or anywhere in between. In some embodiments, the percentage of air flow allocated to a particular level increases with each level in an upwards direction. This allows the levels to be cooled in proportion to the amount of heat that accumulates. For example, in an exemplary four level configuration, the lowest level can receive between 0-10%, the next higher level can receive between 10-20%, the next higher level received between 20-50% and the highest level receives between 40-80% of the airflow. It is appreciated that various other allocations of airflow between levels could be realized. The temperature controllers can be communicatively coupled with one or more temperature sensors (e.g. thermocouples) disposed at one or more locations within the array to facilitate improved temperature control.

FIG. 9 shows a cross-sectional view illustrating the four circular frames defining the array assembly. Each of the circular frames are rotatably coupled within the assembly and operably coupled with a driver or drive mechanism controlled by the controller such that each frame can be rotatably driven so that each row of the array incrementally rotates. Typically, the structure is configured and controlled such that adjacent frames incrementally rotate in opposite directions (e.g. 130*a* rotates clockwise, 130*b* rotates counterclockwise, 130*c* rotates clockwise, 130*d* rotates counterclockwise or vice versa). It is appreciated, however, that various other configurations and movement schemes are within the scope of the invention. Power and communication is supplied to each of the modules 30 in each frame through power and communication cables that extend through the central column and between each rotating frame through slip rings, which allow passage of power and data through a rotating union. In some embodiments, the slip rings include holes to further facilitate passage of air from the central column into each of the levels of the array assembly. Thus, the modules 30 of the array 130 remain electrically and communicatively coupled to a common power source and communication unit of the central control during the differential rotational movement of the array.

Figure 10:
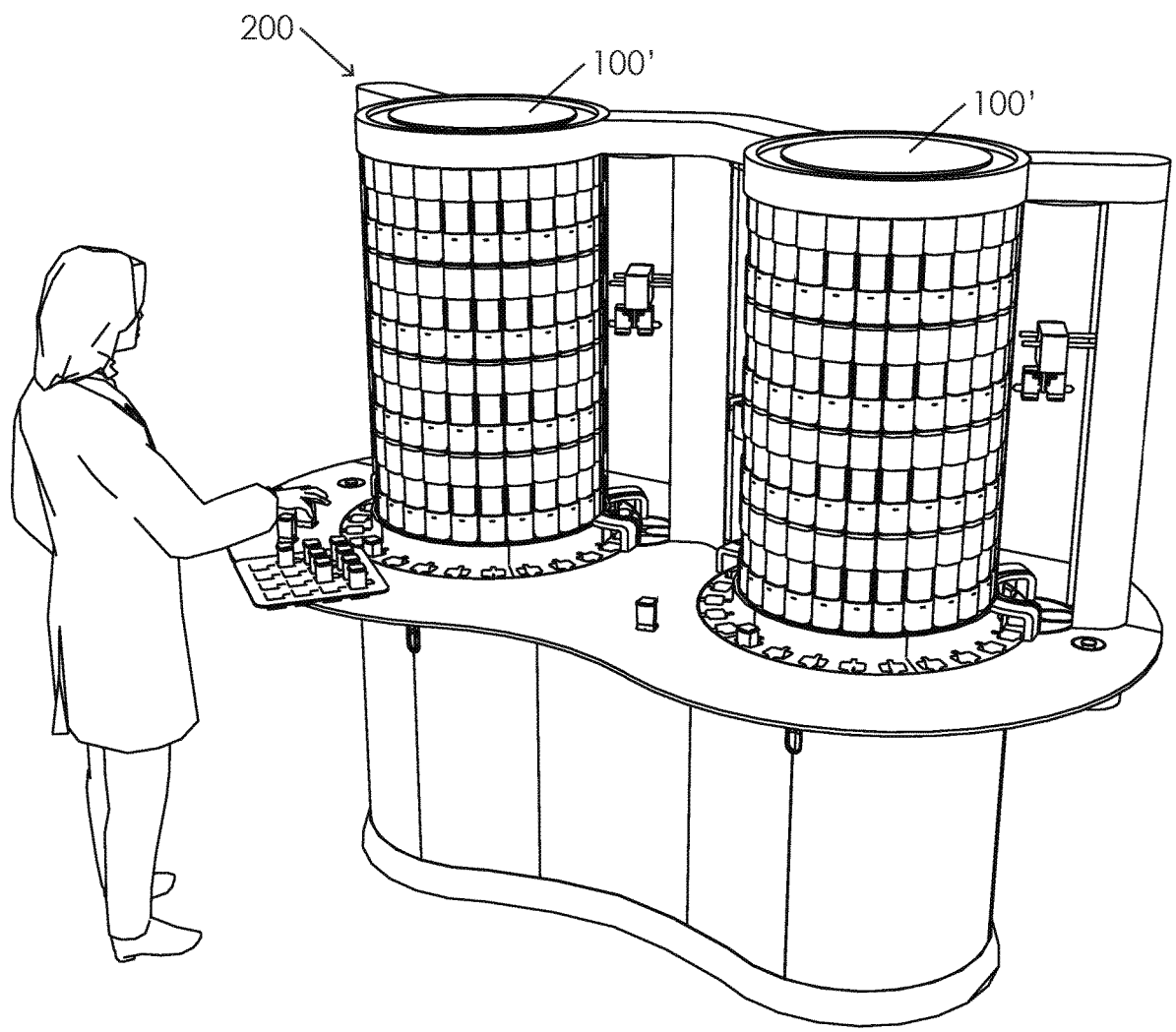
FIG. 10 illustrates an ultra-high throughput handling system with diagnostic assay module array, in accordance with some embodiments.

FIG. 10 illustrates an embodiment showing an ultra-high throughput handling system 200, which includes two systems 100' substantially similar to those described herein, which are integrated into a single system. The system can be defined by same or similar structures as the previously described embodiments with minor modification, such as a modified countertop 114 that extends between two columnar arrays. In some embodiments, the two arrays share a single loading track that can be in the shape of an oval circulating around both arrays. Such a configuration provides ever further improvements in speed and efficiency for processing extremely high-volume streams of diagnostic assay cartridges.

Figure 11:
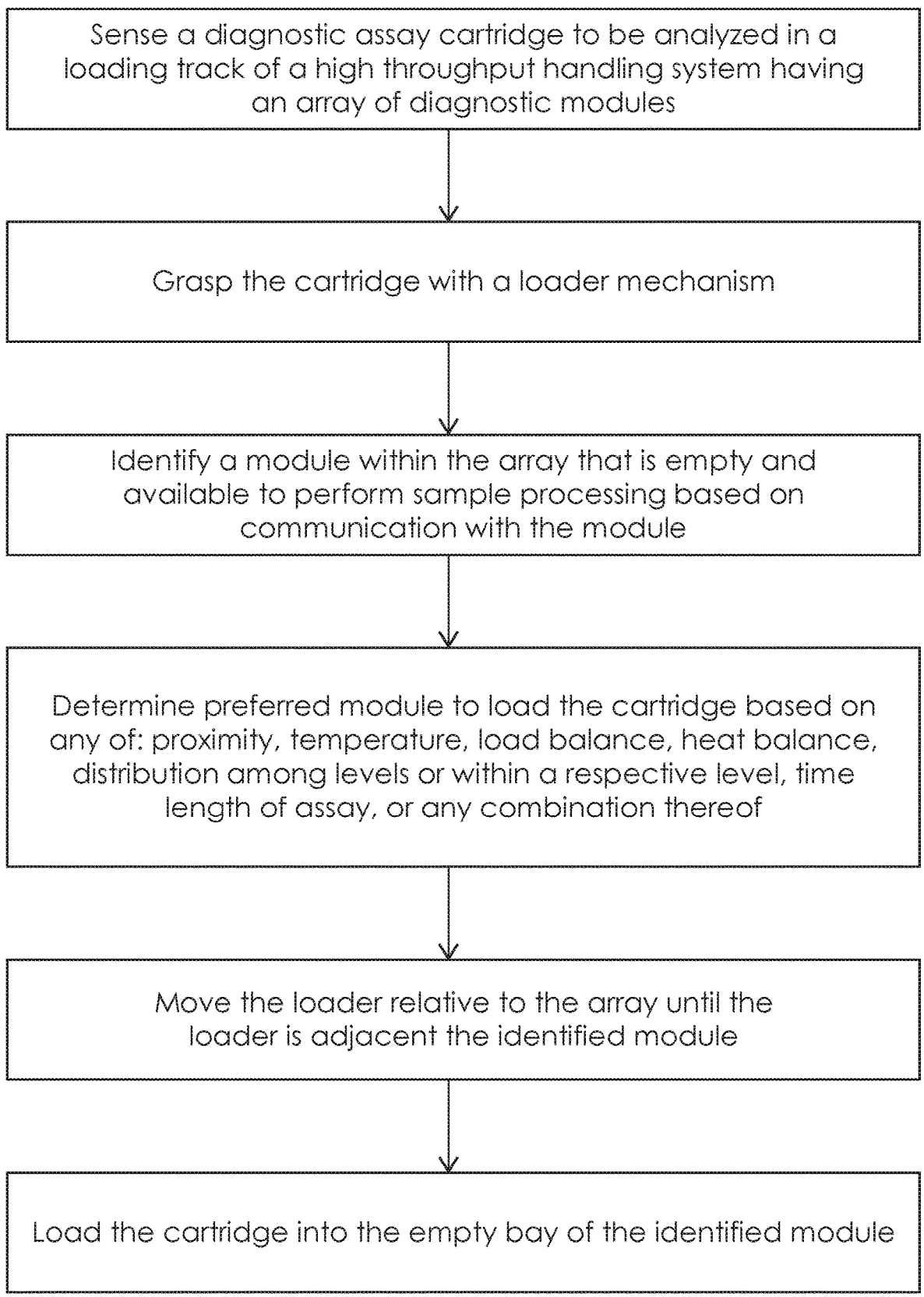
FIGS. 11-12 illustrates methods of performing sample processing using a high throughput handling system, in accordance with some embodiments.
Figure 12:
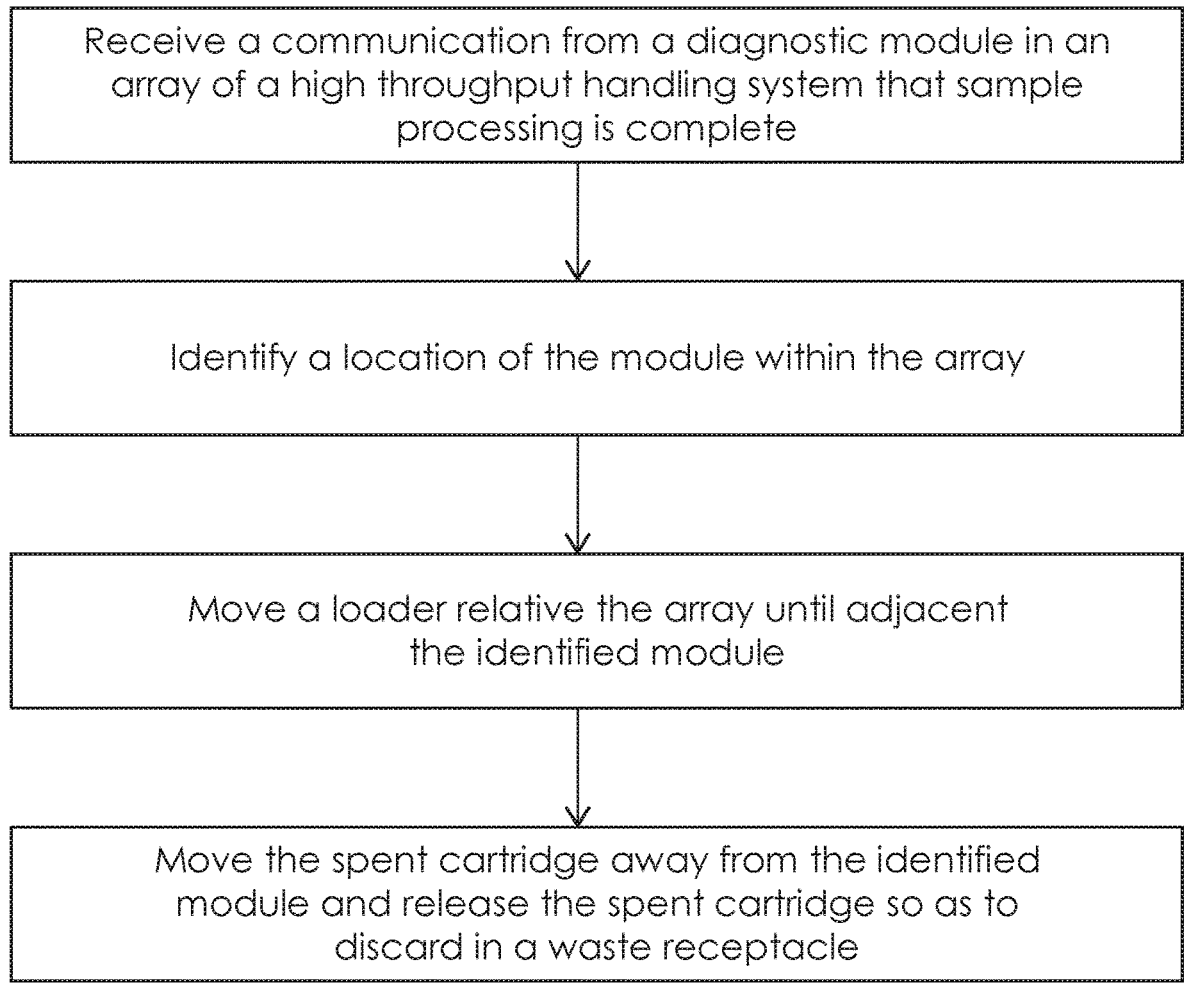

FIGS. 11 and 12 depict methods of loading and unloading diagnostic assay cartridges from a high throughput system in accordance with the invention. FIG. 11 shows a method of automatically loading a diagnostic assay cartridge into an available diagnostic assay module in a circular array of a high throughput handling system. FIG. 12 shows a methods of unloading and discarding a spent diagnostic assay cartridge from a diagnostic assay module in a circular array after processing is complete.

As depicted in FIG. 11, such a method can include a step of sensing a diagnostic assay cartridge to be analyzed in a loading track of a high throughput handling system having an array of diagnostic assay modules. Sensing can include detecting proximity of the cartridge and/or reading information from the cartridge (e.g. ID, assay type, etc.). Next, the system can facilitate loading of the cartridge into the array. Typically, loading includes grasping the cartridge with a loader and loading into an available module. The method can further include identifying a diagnostic assay module within the array that is empty and available to perform sample processing based on communication with the module. Optionally, the method can include determining a preferred diagnostic module in which to load the sample from multiple available modules. Determination of a preferred module can be based on any of: proximity, temperature, load balance, heat balance, distribution among levels or within a respective level, time length of assay, or any combination thereof or any factor desired. The loader then moves the cartridge to the array until the loader is adjacent the identified module in the array and loads the cartridge into the empty bay of the identified or preferred module.

As depicted in FIG. 12, such methods can include a step of receiving a communication from a diagnostic assay module in an array of a high throughput handling system that sample processing is complete. Next, the method can entail identifying a location of the module within the array, then moving a loader/unloader relative the array until adjacent the identified module. This can include waiting until the array is moved to an appropriate position so that the loader can intercept the identifying module when the respective column is moved adjacent the loader. Next, the spent cartridge is removed from the module and moved away from the identified module and released or discarded into a waste receptacle.

Figure 13:
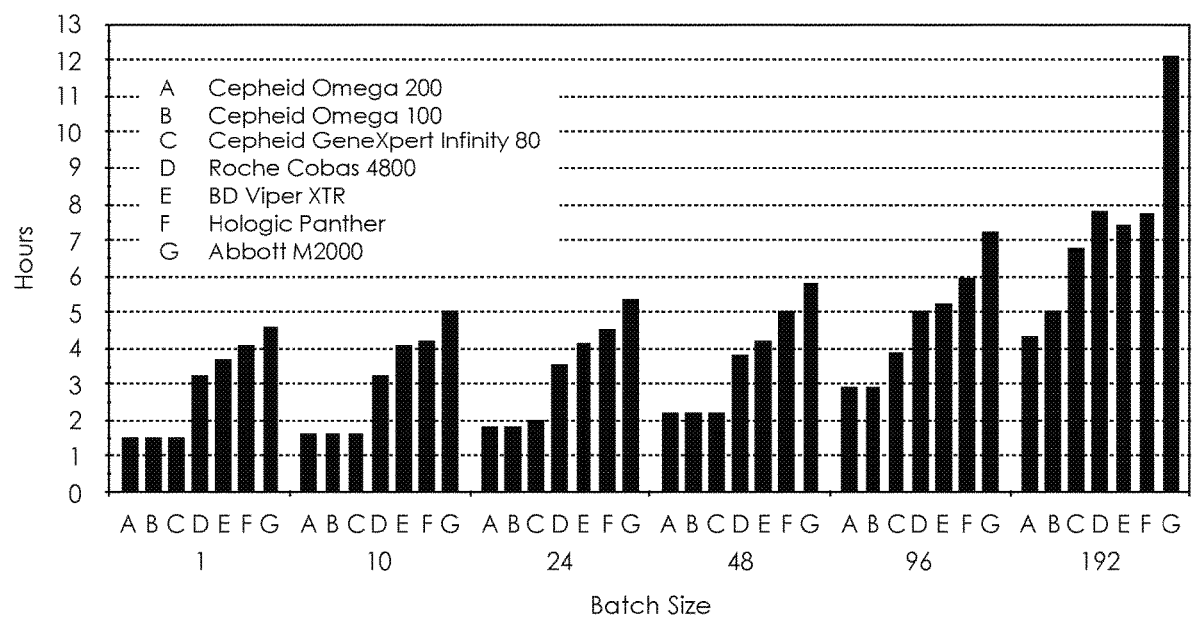
FIG. 13 shows a comparison of throughput times for systems in accordance with embodiments of the invention as compared to commercially available systems

FIG. 13 illustrates throughput of samples on the 100 module system of FIG. 1A (Omega 100) and the 200 module system of FIG. 10 (Omega 200) as compared to conventional high throughput systems (Cepheid Infinity-80, Roche Cobas 4800, BD Viper XTR, Hologic Panther, and Abbott M2000). Throughput data for the Omega system was modeled based on simulation models of the Omega 100 and Omega 200 systems and utilizing available data from each of the commercial systems noted. The data for the commercial systems was obtained from the study by Jang et al. (Sexually Transmitted Disease (June 2016) Vol 43(6):377-381. This data is also provided in Table 1 below. As can be seen, the time required to process a large number of samples with the Omega system is considerably lower than any of the other commercially available systems as shown, for example analysis of 192 sample in the Omega 200 system can be performed in less than half the time required by other commerically available systems.

TABLE 1

Time Comparison of High Throughput Systems

| Samples | Omega 200 | Omega 100 | Infinity | Cobas 4800 | Viper XTR | Panther | M2000 |
|---|---|---|---|---|---|---|---|
| 1 | 1:30 | 1:30 | 1:31 | 3:15 | 3:42 | 4:05 | 4:35 |
| 10 | 1:34 | 1:34 | 1:40 | 3:16 | 4:06 | 4:11 | 5:04 |
| 24 | 1:40 | 1:40 | 2:03 | 3:36 | 4:08 | 4:32 | 5:21 |
| 48 | 1:50 | 1:50 | 2:13 | 3:49 | 4:13 | 5:01 | 5:48 |
| 96 | 2:10 | 2:10 | 3:54 | 5:03 | 5:13 | 5:55 | 7:15 |
| 192 | 2:50 | 4:04 | 6:45 | 7:47 | 7:25 | 7:43 | 12:07 |

Figure 14A:
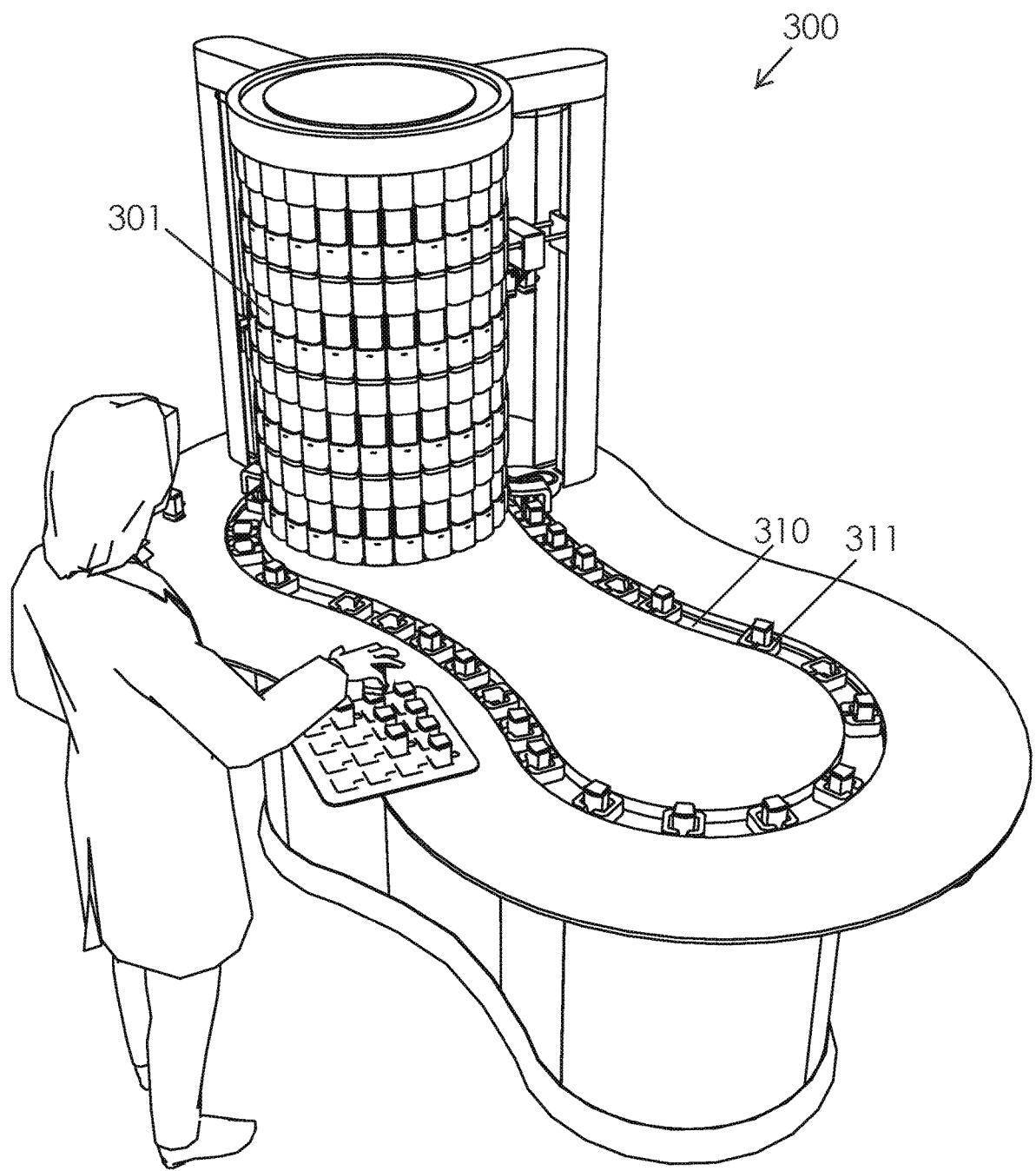
FIGS. 14A-14D show alternative embodiments of module arrays and loading tracks utilized in high throughput handling systems, in accordance with some embodiments.
Figure 14B:
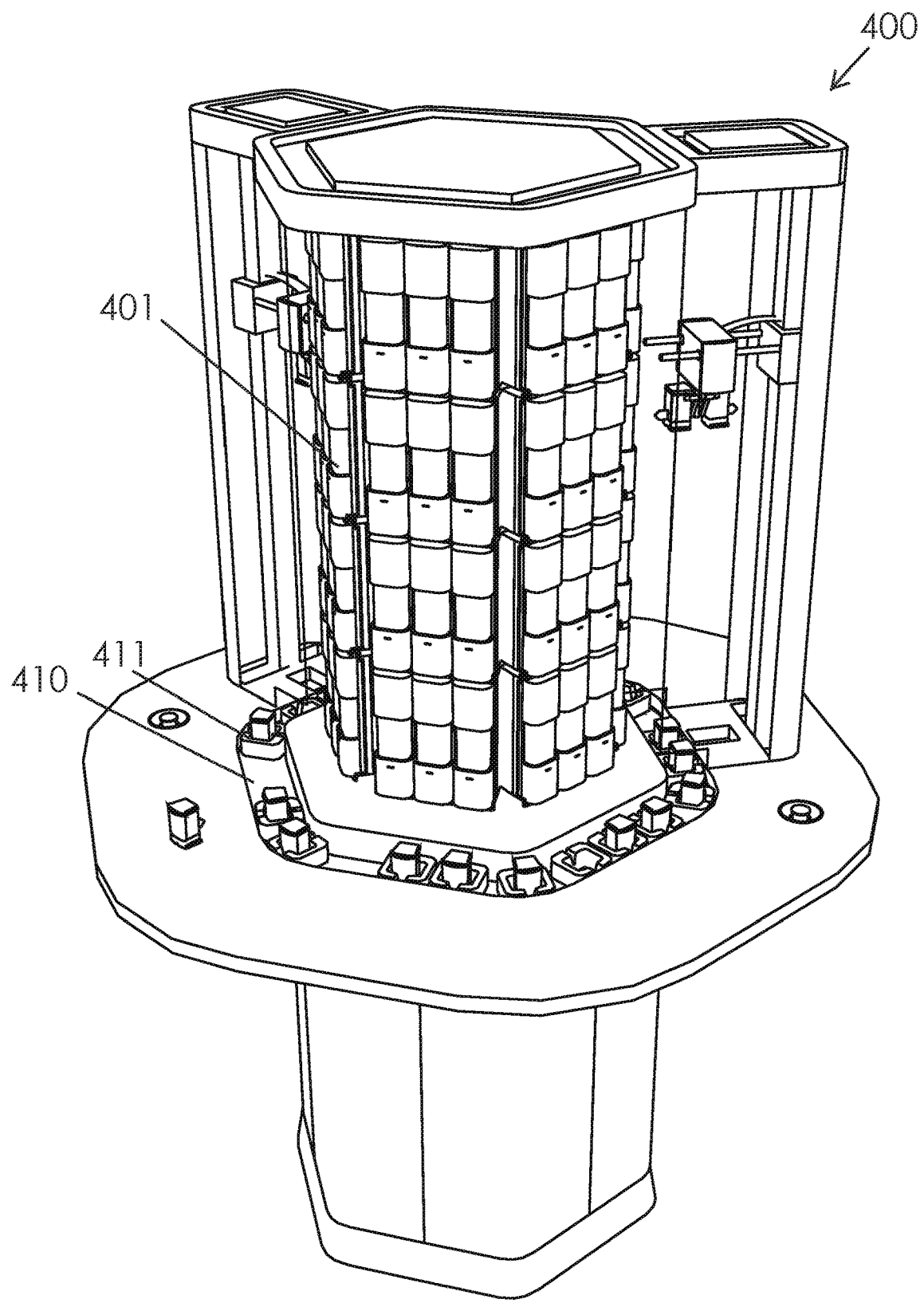
Figure 14C:
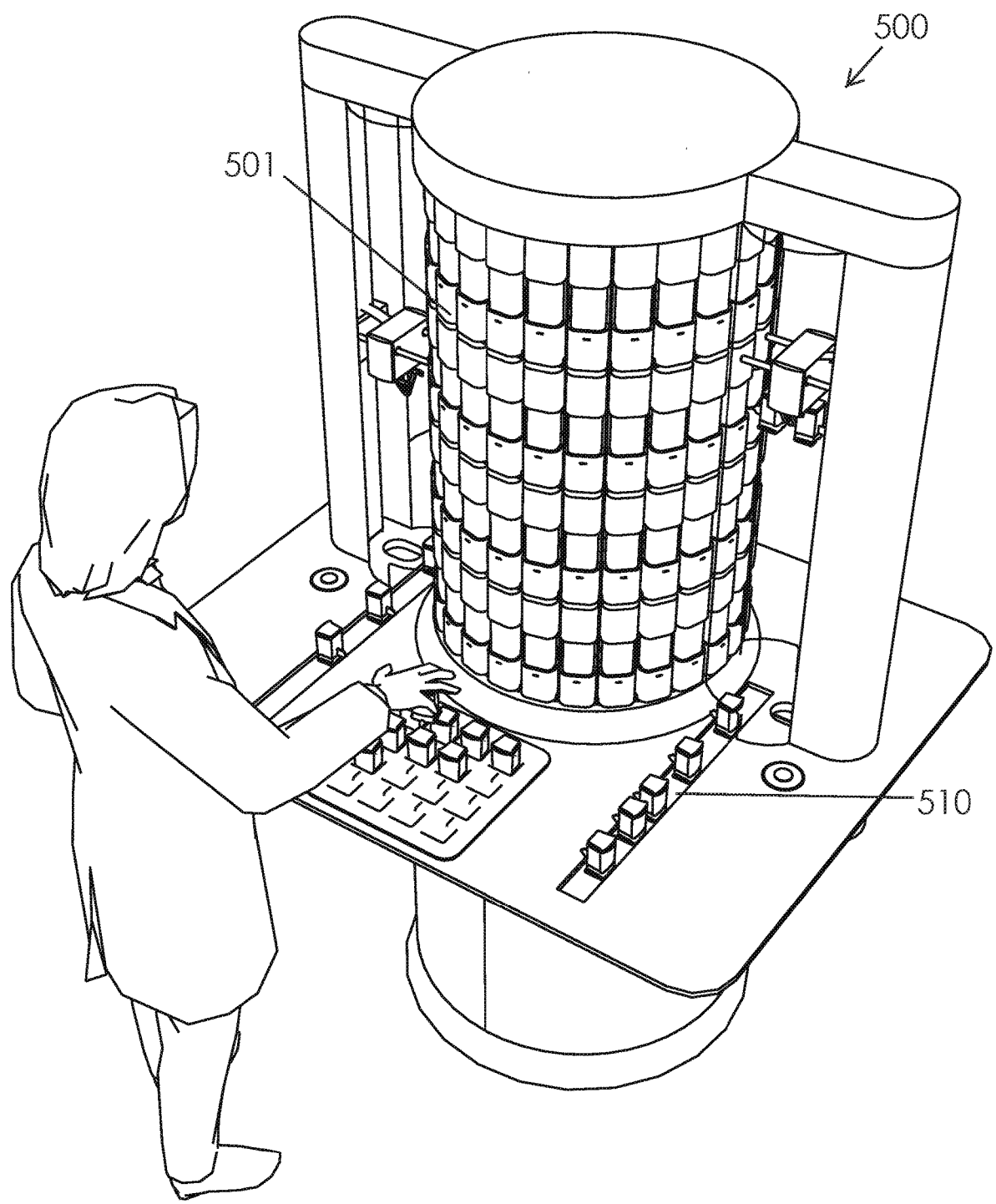
Figure 14D:
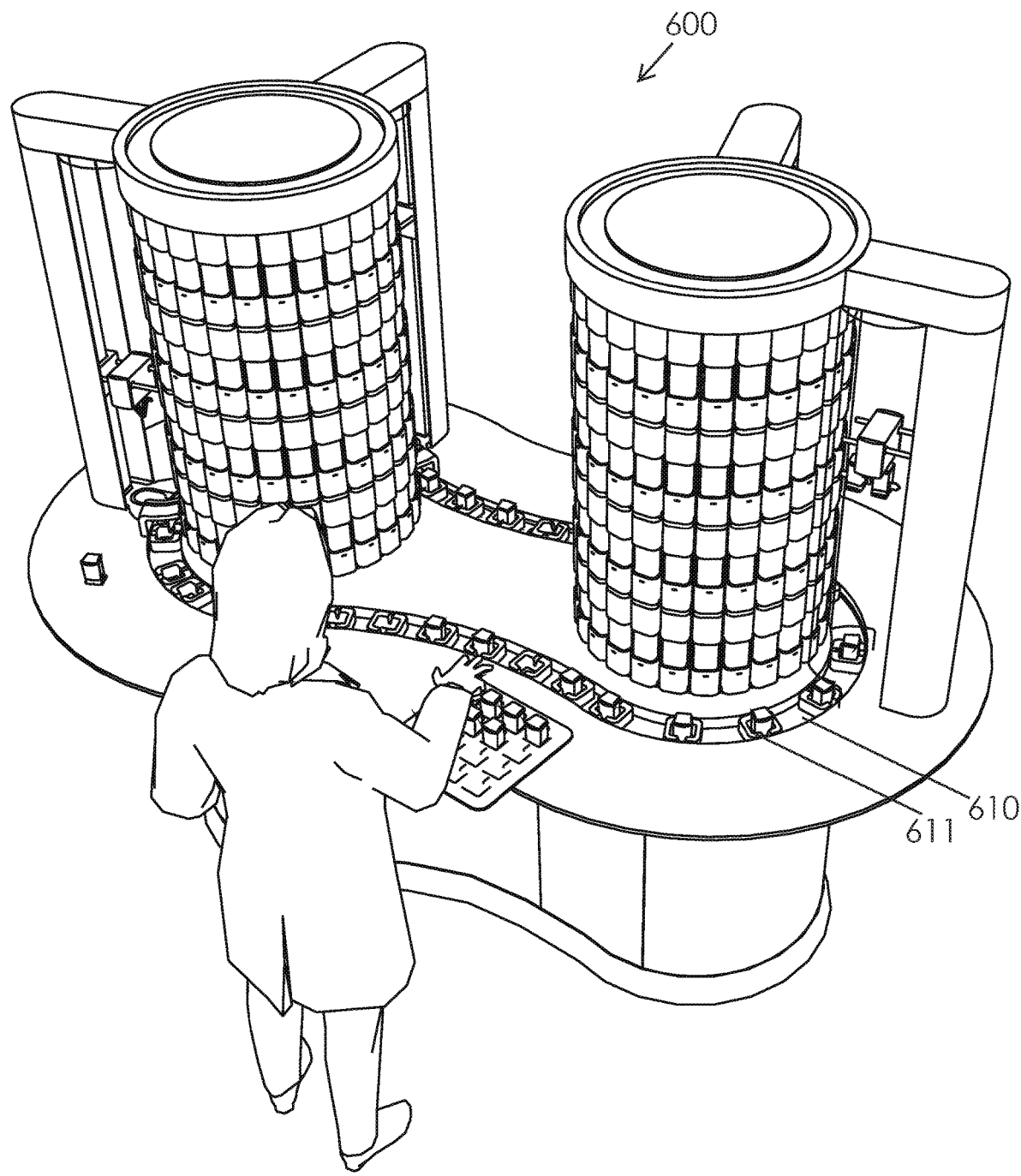

FIGS. 14A-14D illustrate alternative embodiments of a high throughput processing systems, in accordance with aspects of the invention. FIG. 14A shows system 300, which includes a circular array of modules 301 and loading track 310. Similar to other embodiments, loading track 310 is a recirculating track that transports diagnostic assay cartridges to a loader, however, track 310 includes movable cartridge carriers 311 (e.g., carriages or "boats") that circulate within the track. In some embodiments, each cartridge support can be independently movable within the loading track and can be removed and replaced as needed. Each carrier 311 can include a support feature, such as a contoured recess or other suitable feature for releasably supporting the cartridge within the carrier. FIG. 14B shows system 400, which includes a hexagonal array of modules 401 and a similarly shaped loading track 410. Loading track 410 includes cartridge carriers 411, similar to those described in system 300, that transport cartridges to the loader for loading into the hexagonal array. FIG. 14C shows system 500, which includes a circular array of modules 501 and a pair of linear loading tracks 510 that transport cartridges directly to a pair of loaders on each side of the array. Such linear tracks can include any features of the loading tracks described herein or any suitable transport mechanism as would be known to one of skill in the art. FIG. 14D shows system 600, which includes two circular arrays of modules and a dumbbell shaped loading track 610 that transports cartridges to either of the module arrays. As can be seen, loading track 610 can transport a cartridge to any of the loaders associated with either of the module arrays. Such an approach allows the cartridges to be distributed between multiple arrays regardless of whether the cartridge is placed on the loading track 610. Alternatively, the cartridges could be allocated to a particular array, as desired. In this embodiment, loading track 610 utilizes carriers 611 such that those described above in system 300. It is appreciated that loading track could include any loading track feature described herein or could use any suitable alternate transport mechanism. While certain shapes of the module arrays and loading tracks have been described, it is appreciated that various other shapes and arrangements could be utilized in accordance with the principles described herein.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It is recognized that the terms "comprising," "including," and "having," as used herein, are specifically intended to be read as open-ended terms of art.

What is claimed is:

1. A handling system for high throughput processing of a plurality of biological samples, each being within a respective diagnostic assay cartridge of a plurality of diagnostic assay cartridges, the system comprising:
   a plurality of diagnostic assay modules in an array having at least two dimensions, each diagnostic assay module configured for receiving a diagnostic assay cartridge of the plurality and performing a diagnostic assay on the biological sample within the respective diagnostic assay cartridge;
   an array support assembly adapted to support the plurality of diagnostic assay modules in an array having at least two dimensions, wherein the array comprises a plurality of rows, each row including a plurality of carriers for supporting the plurality of diagnostic assay modules, the plurality of carriers being securely attached to a frame that is rotatable about a central rotating hub, wherein the plurality of diagnostic assay modules in each row are coupled to power and communication while supported within the array support assembly;
   a motor and drive mechanism operably coupled with the array support assembly and configured to incrementally rotate each row of the array support assembly;
   a loader adapted to load the plurality of diagnostic assay cartridges within the plurality of diagnostic assay modules while supported within the array support assembly, the loader being translatable between rows of the array support assembly and including a grasper for grasping each of the plurality of diagnostic assay cartridges for loading and/or unloading the respective cartridge from any of the plurality of diagnostic assay modules, such that the diagnostic assay cartridge is loadable in any of the diagnostic assay modules within the array by moving the array support assembly relative the loader in combination with the loader; and a controller configured to coordinate rotation of the array support assembly in combination with movement of the loader in response to sensors and/or determination of empty modules or spent cartridges based on communication with the plurality of modules to facilitate high throughput assays.

2. The system of claim 1, wherein each of the diagnostic assay modules is adapted to perform a diagnostic assay independent from each other.

3. The system of claim 1, wherein the array is a cylindrical array such that each row is circular in a horizontal direction and the plurality of rows are stacked in a vertical direction.

4. The system of claim 1, wherein the array comprises a plurality of horizontal rows and the loader is translatable along a substantially vertical axis so as to be movable between horizontal rows of the cylindrical array.

5. The system of claim 1, wherein the grasper is adapted to insert a cartridge supported by the grasper along a horizontal axis from a grasped position within the grasper to a loaded position within a diagnostic assay module of the array.

6. The system of claim 5, wherein the grasper is further adapted to unload a cartridge loaded in a diagnostic assay module within the array from the loaded position and transport the cartridge away from the respective module.

7. The system of claim 5, wherein the grasper is further adapted to concurrently support at least two cartridges of the plurality of cartridges to facilitate any of:
consecutive loading of the at least two cartridges,
consecutive unloading of the at least two cartridges from respective loaded positions,
unloading of one cartridge of the at least two cartridges from a given module and subsequent loading of another cartridge of the at least two cartridges within the same module, and
unloading of one cartridge of the at least two cartridges from a given module and subsequent loading of another cartridge of the at least two cartridges within a different module.

8. The system of claim 1, wherein the array support structure comprises a stack of circular frames separated by slip rings that transmit power and communication data through a rotating union such that each module has a direct power and communication coupling.

9. The system of claim 8, wherein each of the diagnostic assay modules comprises a rechargeable power source that is wirelessly rechargeable by near-field energy transfer.

10. The system of claim 1, wherein the array support assembly includes one or more sensors associated with each module within the array, the one or more sensors being adapted to determine the location of the modules within the array.

11. The system of claim 7, further comprising:
the controller having an input and an output, the controller being configured to output a control command to the loader to load a diagnostic assay cartridge in a particular diagnostic assay module of the plurality in response to an input received from the one or more sensors that the diagnostic assay module is available for loading.

12. The system of claim 11, wherein the controller is configured to determine a preferred diagnostic assay module from a plurality of available diagnostic assay modules based on any of: proximity, a temperature measurement, a load balance, a heat balance, a distribution among levels or within a respective level, a time length of assay, or any combination thereof.

13. The system of claim 11, wherein the one or more sensors are further configured to obtain a unique ID of each a diagnostic assay module and an associated cartridge loaded therein.

14. The system of claim 11, wherein each diagnostic assay module includes a wireless communication unit adapted to communicate with the controller.

15. The system of claim 12, wherein the wireless communication unit of each diagnostic assay module is configured to communicate to the controller that a diagnostic assay cartridge is associated with a particular diagnostic assay module of the plurality after loading of the cartridge in the respective module.

16. The system of claim 12, wherein the controller is programmed to track which diagnostic assay module of the plurality is associated with each diagnostic assay cartridge of the plurality.

17. The system of claim 12, wherein the controller is programmed to output a command to the loader to load a diagnostic assay cartridge within a diagnostic assay module that is not already associated with a diagnostic assay cartridge.

18. The system of claim 17, wherein the controller is further programmed to output to the loader a command to unload a particular diagnostic assay cartridge after receiving an input that a diagnostic result has been received from the diagnostic assay module associated with the respective cartridge.

19. The system of claim 1, wherein the system further includes a waste receptacle disposed beneath the array support, wherein the loader is further adapted to unload spent diagnostic assay cartridges for collection and discarding within the waste receptacle.

20. The system of claim 1, wherein the system further comprises:
a loading track that conveys a plurality of diagnostic assay cartridges to the loader.

21. The system of claim 20, wherein the loading track defines a plurality of recesses adapted to receive the plurality of diagnostic assay cartridges.

22. The system of claim 21 wherein each recess is configured to maintain each of the plurality of diagnostic assay cartridges in a particular position and/or orientation relative the loading track to facilitate loading with the loader when received.

23. The system of claim 20, wherein the loader includes a grasper adapted to grasp a diagnostic assay cartridge conveyed by the loading track when disposed at a particular loading position.

24. The system of claim 20, wherein the array support defines a cylindrical array and the loading track is a ring that rotates around the cylindrical array.

25. The system of claim 24, wherein the ring-shaped loading track and the cylindrical array rotate about a common longitudinal axis and the ring-shaped loading track is adapted to rotate independently from the cylindrical array.

26. The system of claim 20, wherein the loading track includes one or more sensors adapted to detect when one or more diagnostic assay cartridges are placed in the loading track.

27. The system of claim 26, wherein the loading track is adapted to transport the one or more diagnostic assay cartridges toward the loader in response to detection of the one or more cartridges.

28. The system of claim 1, further comprising:
an air cooling system that directs air through a central column of the array assembly and through each level of the array assembly so as to maintain the entire array assembly within a range of suitable temperatures.

29. The system of claim 28, wherein the range of suitable temperatures is between 65 and 95 degrees Fahrenheit to facilitate a PCR analysis.

30. The system of claim 28, wherein the air cooling system includes a baffle between each level of the array assembly such that air flow is, at least partly, separated between levels.

31. The system of claim 28, wherein the air cooling system includes an external air cooler communicatively coupled with one or more sensors in one or more levels of the array assembly.

32. The system of claim 1, wherein each of the diagnostic assay modules is fixedly secured within the array support assembly yet remains removable to allow repair and/or replacement.

33. The system of claim 1, wherein the array support assembly defines a cylindrical array having a diameter of about 34" or less and a height of 80" or less when secured within the assembled system such that the system is transportable through a standard-sized doorway of 80" in height and 36" in width.

34. The system of claim 1, wherein the array support assembly comprises a plurality of stacked circular frames defining an open central column.

35. The system of claim 31, wherein the system further includes an integrated cooling system that includes:
one or more cooling fans that draw a cool air intake upward from a bottom of the open central column toward a top of the open central column.

36. The system of claim 32, wherein the system further includes circular baffles between each row so as to direct cooling air from the open central column directly to each row of modules within the cylindrical array.

37. The system of claim 1, wherein the array support assembly is a cylindrical array that supports at least 50 modules and includes at least two stacked rows.

38. The system of claim 1, wherein the array support assembly is a cylindrical array, each row supporting 25 modules, and having at least 4 rows such that the array support assembly supports at least 100 modules.

39. The system of claim 1, wherein the array support assembly comprises two cylindrical arrays, each row supporting 25 modules, and each cylindrical array having at least 4 rows such that the system supports 200 modules.

40. The system of claim 20, further comprising:
a cartridge preparer configured to perform one or more sample processes on a fluid sample within a diagnostic assay cartridge before analysis and to subsequently load the prepared diagnostic assay cartridge within the loading track.

\* \* \* \* \*